(12) United States Patent
Chen et al.

(10) Patent No.: US 12,167,334 B2
(45) Date of Patent: Dec. 10, 2024

(54) REFERENCE SIGNAL RECEIVING METHOD, REFERENCE SIGNAL SENDING METHOD, AND APPARATUS

(71) Applicant: Huawei Technologies Co., Ltd., Shenzhen (CN)

(72) Inventors: Zheng Chen, Beijing (CN); Lixia Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 467 days.

(21) Appl. No.: 17/389,031

(22) Filed: Jul. 29, 2021

(65) Prior Publication Data

US 2021/0392582 A1    Dec. 16, 2021

Related U.S. Application Data

(63) Continuation of application No. PCT/CN2020/073511, filed on Jan. 21, 2020.

(30) Foreign Application Priority Data

Jan. 30, 2019   (CN) .......................... 201910090977.X

(51) Int. Cl.
*H04W 52/02*   (2009.01)
*H04L 5/00*    (2006.01)
*H04W 24/10*   (2009.01)

(52) U.S. Cl.
CPC ....... *H04W 52/0232* (2013.01); *H04L 5/0051* (2013.01); *H04W 24/10* (2013.01)

(58) Field of Classification Search
CPC . H04W 24/08; H04W 24/10; H04W 72/0446; H04W 72/23; H04W 76/28;
(Continued)

(56) References Cited

U.S. PATENT DOCUMENTS

2020/0052837 A1*  2/2020  Zhang ................. H04L 25/0226
2020/0145921 A1*  5/2020  Zhang ............... H04W 52/0235
(Continued)

FOREIGN PATENT DOCUMENTS

CN    103444235 A    12/2013
CN    104956717 A     9/2015
(Continued)

OTHER PUBLICATIONS

Qualcomm Inc., "UE Adaptation to the Traffic and UE Power Consumption Characteristics", 3GPP TSG-RAN WG1 Ad-Hoc Meeting 1901, R1-1900911, Taipei, Taiwan, Jan. 21-25, 2019, 24 pages.
(Continued)

*Primary Examiner* — Quoc Thai N Vu
(74) *Attorney, Agent, or Firm* — Slater Matsil, LLP

(57) ABSTRACT

This application provides a reference signal receiving method, a reference signal sending method, and an apparatus. The reference signal receiving method includes: when a terminal device is out of a first time period, detecting, by the terminal device, a first signal, and determining, based on a detection result of the first signal, whether to use a first reference signal to perform time-frequency tracking and/or channel measurement; and receiving, by the terminal device, a second reference signal when the terminal device is in the first time period, where the first reference signal and the second reference signal are reference signals used for time-frequency tracking and/or channel measurement.

15 Claims, 13 Drawing Sheets

(58) Field of Classification Search
CPC ......... H04W 52/0216; H04W 52/0219; H04W 52/0229; H04W 52/0274; H04W 52/0232; H04W 52/0235; H04W 56/001; H04W 56/00; H04L 5/0048; H04L 5/0051; H04L 5/0053; H04L 25/0224; H04L 25/0226; Y02D 30/70
See application file for complete search history.

(56) References Cited

U.S. PATENT DOCUMENTS

| | | | |
|---|---|---|---|
| 2020/0221384 A1* | 7/2020 | Ang | H04W 52/0216 |
| 2021/0058909 A1* | 2/2021 | Wong | H04W 72/23 |
| 2021/0159961 A1* | 5/2021 | Xu | H04W 72/23 |

FOREIGN PATENT DOCUMENTS

| | | | |
|---|---|---|---|
| CN | 105122871 A | 12/2015 | |
| CN | 108633037 A | 10/2018 | |
| CN | 108989010 A | 12/2018 | |
| WO | 2018171742 A1 | 9/2018 | |
| WO | 2018212867 A1 | 11/2018 | |
| WO | 2020142334 A1 | 7/2020 | |

OTHER PUBLICATIONS

ZTE, "On UE Power Saving for RRM Measurement", 3GPP TSG RAN WG1 Meeting #95, R1-1812423, Spokane, WA, US, Nov. 12-16, 2018, 4 pages.

\* cited by examiner

REFERENCE SIGNAL RECEIVING METHOD, REFERENCE SIGNAL SENDING METHOD, AND APPARATUS

CROSS-REFERENCE TO RELATED APPLICATIONS

This application is a continuation of International Application No. PCT/CN2020/073511, filed on Jan. 21, 2020, which claims priority to Chinese Patent Application No. 201910090977.X, filed on Jan. 30, 2019. The disclosures of the aforementioned applications are hereby incorporated by reference in their entireties.

TECHNICAL FIELD

This application relates to the communication field, and more specifically, to a reference signal receiving method, a reference signal sending method, a wireless communication apparatus, and a communication device.

BACKGROUND

To reduce power consumption of a terminal device, a discontinuous reception (DRX) technology is proposed. To be specific, in a DRX mode, a terminal device may periodically enter a sleep mode in some time periods, and does not monitor a slot carrying a physical downlink control channel (PDCCH). When listening is required, the terminal device "wakes up" from the sleep mode, so that the UE can save power.

In addition, to track and compensate for time and frequency variations (or offsets), a tracking reference signal (TRS) technology is proposed. To be specific, an access device may send a TRS to the terminal device, and the terminal device may perform time-frequency tracking based on the TRS.

However, in the current technology, sending of the TRS is periodic and is not affected by a DRX mechanism. In other words, a sending moment of the TRS may not be in a DRX "active time" of the terminal device. In this case, the UE may be in the sleep mode. Even if the terminal device does not need to monitor a PDCCH, the terminal device still needs to wake up from the sleep mode to receive the TRS, increasing power consumption of the terminal device.

SUMMARY

This application provides a reference signal receiving method, a reference signal sending method, and an apparatus, to improve TRS resource utilization and reduce TRS signal overheads, thereby reducing power consumption of a terminal device.

According to a first aspect, a reference signal receiving method is provided, and includes: when a terminal device is out of a first time period, detecting, by the terminal device, a first signal, and determining, based on a detection result of the first signal, whether to use a first reference signal to perform time-frequency tracking and/or channel measurement; and receiving, by the terminal device, a second reference signal when the terminal device is in the first time period, where the first reference signal and the second reference signal are reference signals used for time-frequency tracking and/or channel measurement.

Optionally, after detecting the first signal, the terminal device may use the first reference signal to perform time-frequency tracking, or use the reference signal to perform channel measurement, or the terminal device uses the reference signal to perform time-frequency tracking and channel measurement.

"When a terminal device is out of a first time period, detecting, by the terminal device, a first signal, and determining, based on a detection result of the first signal, whether to use a first reference signal to perform time-frequency tracking and/or channel measurement" may also be understood as: When the terminal device is in a second time period, the terminal device detects the first signal, determine, based on the detection result of the first signal, whether to use the first reference signal to perform time-frequency tracking and/or channel measurement.

The second time period may include at least one time period other than the first time period.

Alternatively, the second time period may include a time period in which the terminal device is not in a DRX active time.

For example, the second time period may include a time period in which none of the following timers is in a running state: an on duration timer, a DRX inactivity timer, or a DRX retransmission timer.

In this application, the first reference signal may be understood as a reference signal that is detected or used based on the detection result of the first signal.

Specifically, if the terminal device detects the first signal, the first reference signal is detected or used by the terminal device.

Specifically, if the terminal device fails to detect the first signal, the first reference signal is not detected or used by the terminal device.

It should be noted that "if the terminal device fails to detect the first signal, the first reference signal is not detected or used by the terminal device" may be understood as: If the terminal device fails to detect the first signal, even if the terminal device detects the first reference signal, the terminal device may not be required to use the first reference signal to perform time-frequency tracking.

Alternatively, "if the terminal device fails to detect the first signal, the first reference signal is not detected or used by the terminal device" may be understood as: If the terminal device fails to detect the first signal, the terminal device determines that an access device does not send the first reference signal.

The first signal may include a wake-up signal (WUS), or may be a power saving signal.

The first reference signal and the second reference signal each may include a tracking reference signal TRS.

Alternatively, the first reference signal and the second reference signal each may include a non-zero power channel state information reference signal NZP-CSI-RS.

In addition, in this application, the first time period is a time period in which the terminal device detects a physical downlink control channel PDCCH or a physical downlink shared channel PDSCH.

For example, the first time period may be referred to as a DRX active time of the terminal device.

For another example, the first time period may be a time period in which at least one of the following timers runs: a DRX on duration timer, a DRX inactivity timer, or a DRX retransmission timer.

In this application, the first reference signal may be a discontinuous transmission DTX reference signal. In other words, in this application, the first reference signal includes a plurality of transmission occasions (or transmission opportunities). On one transmission occasion of the first reference signal, the access device may send the first reference signal, or may not send the first reference signal.

In addition, in this application, the second reference signal may be a periodically sent reference signal.

According to a TRS detection solution provided in this application, two types of TRSs are configured, where a type #1 TRS is detected based on a detection status of a WUS. Depending on whether the terminal device is in the DRX active time, a TRS that needs to be detected is selected from the two types of TRSs. To be specific, when the terminal device is not in the DRX active time (or when the terminal device is in a sleep time), if the terminal device fails to detect the WUS, the terminal device does not detect the TRS. Therefore, the terminal device can be prevented from waking up from a sleep mode with the need to receive the TRS, thereby reducing power consumption of the terminal device.

For example, in this application, "the first reference signal may be understood as a reference signal that is detected or used based on the detection result of the first signal" may include the following explanations:

That is, optionally, the detecting, by the terminal device, a first signal, and determining, based on a detection result of the first signal, whether to use a first reference signal to perform time-frequency tracking and/or channel measurement includes: when the terminal device detects the first signal on a first transmission occasion, detecting, by the terminal device, the first reference signal on a second transmission occasion, and using the first reference signal to perform time-frequency tracking and/or channel measurement; or when the terminal device fails to detect the first signal on a first transmission occasion, skipping detecting, by the terminal device, the first reference signal on a second transmission occasion.

In this case, for example, a transmission occasion of the first signal may be the same as a transmission occasion of the first reference signal. In other words, the transmission occasion of the first signal and the transmission occasion of the first reference signal may be in a same time unit.

For another example, a transmission occasion of the first signal may be different from a transmission occasion of the first reference signal. In other words, the transmission occasion of the first signal and the transmission occasion of the first reference signal may be in different time units. In this case, the transmission occasion of the first signal is before the transmission occasion of the first reference signal.

Alternatively, in this application, "the first reference signal may be understood as a reference signal that is detected or used based on the detection result of the first signal" may include the following explanations:

That is, optionally, the detecting, by the terminal device, a first signal, and determining, based on a detection result of the first signal, whether to use a first reference signal to perform time-frequency tracking and/or channel measurement includes: demodulating and detecting, by the terminal device, the first signal based on the first reference signal. The method further includes: when the terminal device detects the first signal, using, by the terminal device, the first reference signal to perform time-frequency tracking and/or channel measurement; or when the terminal device fails to detect the first signal, skipping using, by the terminal device, the first reference signal to perform time-frequency tracking and/or channel measurement.

In this case, a transmission occasion of the first signal may be the same as a transmission occasion of the first reference signal. In other words, the transmission occasion of the first signal and the transmission occasion of the first reference signal may be in a same time unit.

Optionally, the receiving, by the terminal device, a second reference signal includes: periodically receiving, by the terminal device, the second reference signal in the first time period.

Optionally, the method further includes: when the transmission occasion of the first reference signal is in the first time period, skipping detecting, by the terminal device, the first reference signal on the transmission occasion of the first reference signal.

In other words, the terminal device does not detect the first reference signal in the first time period.

In other words, the terminal device detects only the second reference signal in the first time period.

In addition, in this application, the terminal device does not detect the second reference signal out of the first time period.

In other words, the terminal device detects only the first reference signal out of the first time period.

Optionally, the first reference signal is a common reference signal of a terminal device group, the terminal device group includes the terminal device, and the second reference signal is a dedicated reference signal of the terminal device.

According to a second aspect, a reference signal sending method is provided, and includes: determining, by an access device when a terminal device is out of a first time period, whether to send a first reference signal to the terminal device; and sending, by the access device, a second reference signal to the terminal device when the terminal device is in the first time period, where the first reference signal and the second reference signal are reference signals used for time-frequency tracking and/or channel measurement.

"Determining, by an access device when a terminal device is out of a first time period, whether to send a first reference signal to the terminal device" may also be understood as: When the terminal device is in a second time period, the access device determines whether to send the first reference signal to the terminal device.

The second time period may include at least one time period other than the first time period.

Alternatively, the second time period may include a time period in which the terminal device is not in an active time.

For example, the second time period may include a time period in which none of the following timers is in a running state: an on duration timer, a DRX inactivity timer, or a DRX retransmission timer.

In this application, the first reference signal may be understood as a reference signal that is detected or used based on the detection result of the first signal.

Specifically, if the terminal device detects the first signal, the first reference signal is detected or used by the terminal device.

Specifically, if the terminal device fails to detect the first signal, the first reference signal is not detected or used by the terminal device.

It should be noted that "if the terminal device fails to detect the first signal, the first reference signal is not detected or used by the terminal device" may be understood as: If the terminal device fails to detect the first signal, even if the terminal device detects the first reference signal, the terminal device does not use the first reference signal to perform time-frequency tracking.

Alternatively, "if the terminal device fails to detect the first signal, the first reference signal is not detected or used by the terminal device" may be understood as: If the terminal device fails to detect the first signal, the terminal device determines that an access device does not send the first reference signal.

The first signal may include a wake-up signal WUS.

The first reference signal and the second reference signal each may include a tracking reference signal TRS.

Alternatively, the first reference signal and the second reference signal each may include a non-zero power channel state information reference signal NZP-CSI-RS.

In addition, in this application, the first time period is a time period in which the terminal device detects a physical downlink control channel PDCCH or a physical downlink shared channel PDSCH.

For example, the first time period may be referred to as an active time of the terminal device.

For another example, the first time period may be a time period in which at least one of the following timers runs: an on duration timer, a DRX inactivity timer, or a DRX retransmission timer.

In this application, the first reference signal may be a discontinuous transmission DTX reference signal. In other words, in this application, the first reference signal includes a plurality of transmission occasions (or transmission opportunities). On one transmission occasion of the first reference signal, the access device may send the first reference signal, or may not send the first reference signal.

In addition, in this application, the second reference signal may be a periodically sent reference signal.

According to a TRS transmission solution provided in this application, two types of TRSs are configured, where a type #1 TRS is transmitted based on a transmission status of a WUS. Depending on a determining result of whether the terminal device is in the active time, a TRS that needs to be transmitted is selected from the two types of TRSs. To be specific, when the terminal device is not in the active time (or when the terminal device is in a sleep time), if the terminal device fails to detect the WUS, the terminal device does not receive the TRS. Therefore, the terminal device can be prevented from waking up from a sleep mode with the need to receive the TRS, thereby reducing power consumption of the terminal device.

In this application, "when the terminal device is out of the first time period, the access device sends the first reference signal depending on a determining result of whether to send the first signal to the terminal device" may include any one of the following explanations:

1. When the terminal device is out of the first time period, if the access device determines that the first signal needs to be sent to the terminal device, the access device may send the first reference signal on a transmission occasion of the first reference signal.

For example, optionally, the determining, by an access device when a terminal device is out of a first time period, whether to send a first reference signal to the terminal device includes: when the terminal device is out of the first time period, sending, by the access device, the first reference signal to the terminal device on a second transmission occasion when the access device sends the first signal to the terminal device on a first transmission occasion.

2. When the terminal device is out of the first time period, if the access device determines that the first signal does not need to be sent to the terminal device, the access device may not send the first reference signal on a transmission occasion of the first reference signal.

For example, optionally, the determining, by an access device when a terminal device is out of a first time period, whether to send a first reference signal to the terminal device includes: when the terminal device is out of the first time period, skipping sending, by the access device, the first reference signal to the terminal device on a second transmission occasion when the access device does not send the first signal to the terminal device on a first transmission occasion.

3. When the terminal device is out of the first time period, if the access device determines that the first signal does not need to be sent to the terminal device, the access device may send the first reference signal on a transmission occasion of the first reference signal. However, in this case, the terminal device does not detect or use the first reference signal.

For example, optionally, the determining, by an access device when a terminal device is out of a first time period, whether to send a first reference signal to the terminal device includes: when the terminal device is out of the first time period, sending, by the access device, the first reference signal to the terminal device on a second transmission occasion when the access device does not send the first signal to the terminal device on a first transmission occasion.

The transmission occasion of the first reference signal and a transmission occasion of the first signal are in a same time unit.

Alternatively, the transmission occasion of the first reference signal and a transmission occasion of the first signal are in different time units. In this case, the transmission occasion of the first reference signal is after the transmission occasion of the first signal.

Optionally, the sending, by the access device, a second reference signal includes:

periodically sending, by the access device, the second reference signal in the first time period.

Optionally, the method further includes: when the transmission occasion of the first reference signal is in the first time period, skipping sending, by the access device, the first reference signal on the transmission occasion of the first reference signal.

In other words, the access device is prohibited from sending the first reference signal in the first time period.

In other words, the access device sends only the second reference signal in the first time period.

In addition, in this application, the access device is prohibited from sending the second reference signal out of the first time period.

In other words, the access device sends only the first reference signal out of the first time period.

Optionally, the first reference signal is a common reference signal of a terminal device group, the terminal device group includes the terminal device, and the second reference signal is a dedicated reference signal of the terminal device.

According to a third aspect, a tracking reference signal receiving method is provided, and includes: determining, by a terminal device, a discontinuous reception DRX state, where the DRX state includes a state indicating whether the terminal device is in an active time; and receiving, by the terminal device, a tracking reference signal TRS based on the DRX state.

According to a TRS transmission solution provided in this application, two types of TRSs are configured, where a type #1 TRS is transmitted based on a transmission status of a WUS. Depending on a determining result of whether the terminal device is in the active time, a TRS that needs to be transmitted is selected from the two types of TRSs. To be specific, when the terminal device is not in the active time (or when the terminal device is in a sleep time), if the terminal device fails to detect the WUS, the terminal device does not receive the TRS. Therefore, the terminal device can be prevented from waking up from a sleep mode with the need to receive the TRS, thereby reducing power consumption of the terminal device.

Optionally, the receiving, by the terminal device, a tracking reference signal TRS based on the DRX state includes: receiving, by the terminal device, a first TRS when the terminal device is not in the active time, where the first TRS includes a TRS transmitted based on a discontinuous transmission DTX technology; and; receiving, by the terminal device, a second TRS when the terminal device is in the active time, where the second TRS includes a periodically transmitted TRS.

Optionally, the active time includes a time period in a running period of at least one of the following timers: an on duration timer, a DRX inactivity timer, or a DRX retransmission timer.

Optionally, the first TRS is a common TRS of a terminal device group, the terminal device group includes the terminal device, and the second TRS is a dedicated TRS of the terminal device.

Optionally, the first TRS includes a TRS transmitted based on a wake-up signal WUS.

Optionally, the receiving, by the terminal device, a first TRS includes: when the terminal device receives the WUS in a first time unit, receiving the first TRS in a second time unit, where there is a specified time interval between the second time unit and the first time unit; or when the terminal device does not receive the WUS in a first time unit, prohibiting receiving of the first TRS in a second time unit.

Optionally, the receiving, by the terminal device, a first TRS includes: detecting, by the terminal device, the WUS in a third time unit based on the first TRS; and if the detection succeeds, determining, by the terminal device, that an access device sends the first TRS; or if the detection fails, determining, by the terminal device, that an access device does not send the first TRS.

Optionally, the method further includes: if the detection fails, determining, by the terminal device, that the access device does not send the WUS.

Optionally, the first TRS corresponds to a first time-frequency resource, the WUS corresponds to a second time-frequency resource, the first time-frequency resource and the second time-frequency resource are different in frequency domain, and both the first time-frequency resource and the second time-frequency resource correspond to the third time unit in time domain.

Optionally, the first time-frequency resource and the second time-frequency resource correspond to a same symbol in time domain.

According to a fourth aspect, a tracking reference signal sending method is provided, and includes: determining, by an access device, a discontinuous reception DRX state of a terminal device, where the DRX state includes a state indicating whether the terminal device is in an active time; and sending, by the access device, a tracking reference signal TRS based on the DRX state of the terminal device.

According to a TRS transmission solution provided in this application, two types of TRSs are configured, where a type #1 TRS is transmitted based on a transmission status of a WUS. Depending on a determining result of whether the terminal device is in the active time, a TRS that needs to be transmitted is selected from the two types of TRSs. To be specific, when the terminal device is not in the active time (or when the terminal device is in a sleep time), if the terminal device fails to detect the WUS, the terminal device does not receive the TRS. Therefore, the terminal device can be prevented from waking up from a sleep mode with the need to receive the TRS, thereby reducing power consumption of the terminal device.

Optionally, the sending, by the access device, a TRS based on the DRX state includes: sending, by the access device, a first TRS when the terminal device is not in the active time, where the first TRS includes a TRS transmitted based on a discontinuous transmission DTX technology; or sending, by the access device, a second TRS when the terminal device is in the active time, where the second TRS includes a periodically transmitted TRS.

Optionally, the active time includes a time period in a running period of at least one of the following timers: an on duration timer, a DRX inactivity timer, or a DRX retransmission timer.

Optionally, the first TRS is a common TRS of a terminal device group, the terminal device group includes the terminal device, and the second TRS is a dedicated TRS of the terminal device.

Optionally, the first TRS includes a TRS transmitted based on a wake-up signal WUS.

Optionally, the sending, by the access device, a first TRS includes: when the WUS is sent in a first time unit, sending the first TRS in a second time unit, where there is a specified time interval between the second time unit and the first time unit; or when the WUS is not sent in a first time unit, prohibiting sending of the first TRS in a second time unit.

Optionally, the first TRS corresponds to a first time-frequency resource, the WUS corresponds to a second time-frequency resource, the first time-frequency resource and the second time-frequency resource are different in frequency domain, and both the first time-frequency resource and the second time-frequency resource correspond to a same time unit in time domain.

Optionally, the first time-frequency resource and the second time-frequency resource correspond to a same symbol in time domain.

According to a fifth aspect, a wireless communication apparatus is provided, and includes a processing unit and a storage unit.

The units in the apparatus are separately configured to perform the steps of the communication method in the first aspect and the implementations of the first aspect.

In a design, the apparatus is a communication chip. The communication chip may include an input circuit or interface configured to send information or data, and an output circuit or interface configured to receive information or data.

In another design, the apparatus is a communication device. The communication device may include a transmitter configured to send information or data, and a receiver configured to receive information or data.

According to a sixth aspect, a wireless communication apparatus is provided, and includes a processing unit and a storage unit.

The units in the apparatus are separately configured to perform the steps of the communication method in the second aspect and the implementations of the second aspect.

In a design, the apparatus is a communication chip. The communication chip may include an input circuit or interface configured to send information or data, and an output circuit or interface configured to receive information or data.

In another design, the apparatus is a communication device. The communication device may include a transmitter configured to send information or data, and a receiver configured to receive information or data.

According to a seventh aspect, a wireless communication apparatus is provided, and includes a processor, a memory, a control circuit, an antenna, and an input/output apparatus.

The units in the apparatus are separately configured to perform the steps of the communication method in the third aspect and the implementations of the third aspect.

In a design, the apparatus is a communication chip. The communication chip may include an input circuit or interface configured to send information or data, and an output circuit or interface configured to receive information or data.

In another design, the apparatus is a communication device. The communication device may include a transmitter configured to send information or data, and a receiver configured to receive information or data.

According to an eighth aspect, a wireless communication apparatus is provided, and includes a radio frequency unit and a baseband unit.

The units in the apparatus are separately configured to perform the steps of the communication method in the fourth aspect and the implementations of the fourth aspect.

In a design, the apparatus is a communication chip. The communication chip may include an input circuit or interface configured to send information or data, and an output circuit or interface configured to receive information or data.

In another design, the apparatus is a communication device. The communication device may include a transmitter configured to send information or data, and a receiver configured to receive information or data.

According to a ninth aspect, a communication device is provided, including a processor and a memory. The memory is configured to store a computer program, and the processor is configured to invoke the computer program from the memory and run the computer program, to enable the communication device to perform the communication method according to any one of the first aspect to the fourth aspect and the implementations of the first aspect to the fourth aspect.

Optionally, there are one or more processors, and there are one or more memories.

Optionally, the memory may be integrated with the processor, or the memory and the processor are separately disposed.

Optionally, the forwarding device further includes a transmitting machine (transmitter) and a receiving machine (receiver).

According to a tenth aspect, a communication system is provided, and includes the communication device provided in the ninth aspect.

In a possible design, the communication system may further include another device that interacts with the communication device and that is in the solutions provided in the embodiments of this application.

According to an eleventh aspect, a computer program product is provided. The computer program product includes a computer program (which may also be referred to as code or instructions). When the computer program is run, a computer is enabled to perform the method according to any one of the possible implementations of the first aspect to the fourth aspect.

According to a twelfth aspect, a computer-readable medium is provided. The computer-readable medium stores a computer program (which may also be referred to as code or instructions). When the computer program is run on a computer, the computer is enabled to perform the method according to any one of the possible implementations of the first aspect to the fourth aspect.

According to a thirteenth aspect, a chip system is provided. The chip system includes a memory and a processor. The memory is configured to store a computer program. The processor is configured to invoke the computer program from the memory and run the computer program, so that a communication device on which the chip system is installed performs the method according to any one of the possible implementations of the first aspect to the fourth aspect.

The chip system may include an input circuit or interface configured to send information or data, and an output circuit or interface configured to receive information or data.

According to a TRS transmission solution provided in this application, two types of TRSs are configured, where a type #1 TRS is transmitted based on a transmission status of a WUS. Depending on a determining result of whether the terminal device is in the active time, a TRS that needs to be transmitted is selected from the two types of TRSs. To be specific, when the terminal device is not in the active time (or when the terminal device is in a sleep time), if the terminal device fails to detect the WUS, the terminal device does not receive the TRS. Therefore, the terminal device can be prevented from waking up from a sleep mode with the need to receive the TRS, thereby reducing power consumption of the terminal device.

DETAILED DESCRIPTION OF ILLUSTRATIVE EMBODIMENTS

Figure 1:
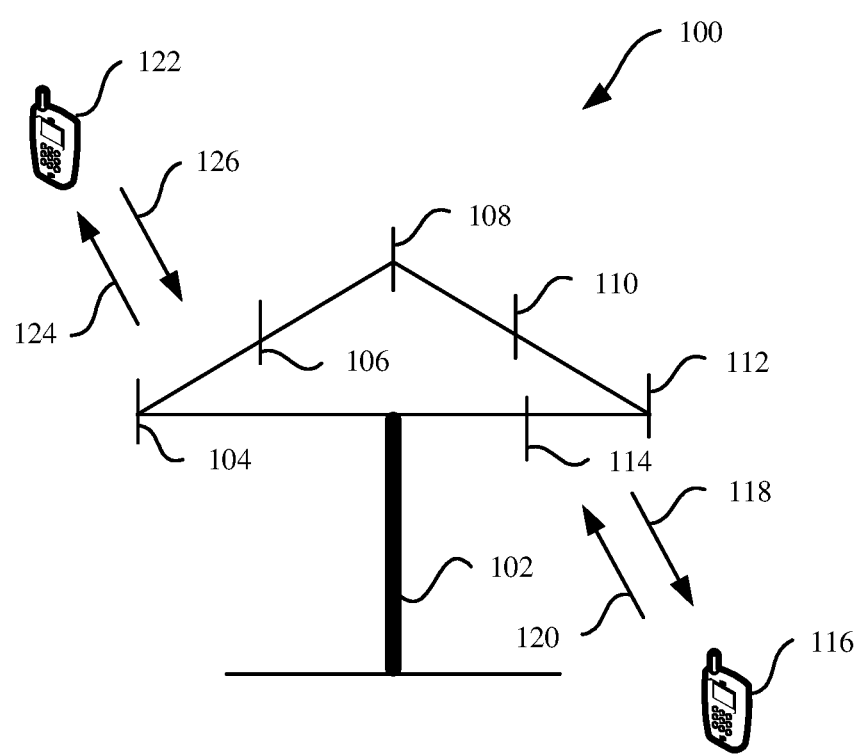
FIG. 1 is a schematic architectural diagram of a communication system according to this application.

The following describes technical solutions of this application with reference to the accompanying drawings.

The technical solutions in the embodiments of this application may be applied to various communication systems, such as a global system for mobile communications (GSM)

system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, and a 5th generation (5G) system or new radio (NR) system.

As an example instead of a limitation, in the embodiments of this application, a terminal device may also be referred to as user equipment, an access terminal, a subscriber unit, a subscriber station, a mobile station, a mobile console, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, a wearable device, a terminal device in a future 5G network, or a terminal device in a future evolved public land mobile network (PLMN). This is not limited in the embodiments of this application.

As an example instead of a limitation, the terminal device in the embodiments of this application may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that is directly worn by a user or integrated into clothes or an accessory of the user. The wearable device is not only a hardware device, but also implements a powerful function through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with another device such as a smartphone, for example, various smart bands or smart accessories for monitoring physical signs.

In addition, the terminal device in the embodiments of this application may alternatively be a terminal device in an internet of things (IoT) system. IoT is an important part of future development of information technologies. A main technical feature of IoT is connecting a thing to a network by using a communication technology, to implement an intelligent network for interconnection between a person and a machine or between one thing and another.

In the embodiments of this application, an IoT technology may implement massive connections, deep coverage, and terminal power saving by using, for example, a narrowband NB technology. For example, NB includes only one resource block (RB). In other words, a bandwidth of NB is only 180 KB. To implement massive access, terminals are required to be discrete in access. According to a communication method in the embodiments of this application, a congestion problem that occurs when massive terminals access a network through the NB in the IoT technology can be effectively resolved.

In addition, in this application, the terminal device may alternatively include a sensor such as an intelligent printer, a train detector, or a gas station, and main functions of the terminal device include: collecting data (for some terminal devices), receiving control information and downlink data from a network device, sending an electromagnetic wave, and sending uplink data to the network device.

In the embodiments of this application, a network device may be a device configured to communicate with the terminal device. The network device may be a base transceiver station (BTS) in a global system for mobile communications (GSM) system or a code division multiple access (CDMA) system, may be a NodeB (NB) in a wideband code division multiple access (WCDMA) system, may be an evolved NodeB (eNB or eNodeB) in an LTE system, or may be a radio controller in a scenario of a cloud radio access network (CRAN). Alternatively, the network device may be a relay node, an access point, a vehicle-mounted device, a wearable device, a network device in a future 5G network, a network device in a future evolved PLMN network, or the like, may be an access point (AP) in a WLAN, or may be a gNB in a new radio (NR) system. This is not limited in the embodiments of this application.

In addition, in the embodiments of this application, an access device serves a cell. The terminal device communicates with the access device on a transmission resource (for example, a frequency domain resource, namely, a spectrum resource) used for the cell. The cell may be a cell corresponding to the access device (for example, a base station). The cell may belong to a macro base station, or a base station corresponding to a small cell. The small cell herein may include a metro cell, a micro cell, a pico cell, a femto cell, or the like. These small cells have features of small coverage and low transmit power, and are suitable for providing a high-rate data transmission service.

In addition, a plurality of cells may simultaneously work in a same frequency band on a carrier in the LTE system or the 5G system. In some special scenarios, a concept of the carrier may be considered equivalent to that of the cell. For example, in a carrier aggregation (CA) scenario, both a carrier index of a secondary component carrier and a cell identifier (Cell ID) of a secondary cell that works on the secondary component carrier are carried when the secondary component carrier is configured for UE. In this case, the concept of the carrier may be considered equivalent to that of the cell. For example, that the UE accesses a carrier is equivalent to that the UE accesses a cell.

A core network device may be connected to a plurality of access devices, and configured to control the access devices; and can distribute, to the access devices, data received from a network side (for example, the internet).

In addition, in this application, the network device may include a gNB, for example, a macro base station, a micro base station, an indoor hotspot, or a relay node, and has functions of: sending a radio wave to the terminal device, to implement downlink data transmission on one hand and control uplink transmission by sending scheduling information on the other hand; and receiving a radio wave sent by the terminal device, to receive uplink data transmission.

The foregoing listed functions and specific implementations of the terminal device, an access device, and a core network device are merely examples for description, and this application is not limited thereto.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more computer operating systems, for example, a Linux operating system, a Unix operating system, an Android operating system, an iOS operating system, and a Windows operating system, that implement service processing by using a process. The application layer includes applications such as a browser, an address book, word processing software, and instant communication software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the method provided in the embodiments of this application may be performed by the terminal device or the network device, or a function module that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD), or a digital versatile disc (DVD)), and a smart card and a flash memory component (for example, an erasable programmable read-only memory (EPROM), a card, a stick, or a key drive). In addition, various storage media described in this specification may represent one or more devices and/or other machine-readable media that are configured to store information. The term "machine-readable medium" may include but is not limited to a radio channel, and various other media that can store, contain, and/or carry instructions and/or data.

It should be noted that in the embodiments of this application, a plurality of applications may be run at the application layer. In this case, an application for performing the communication method in the embodiments of this application and an application configured to control a receive end device to implement an action corresponding to received data may be different applications.

FIG. 1 is a schematic diagram of a system 100 to which a communication method according to an embodiment of this application is applicable. As shown in FIG. 1, the system 100 includes an access device 102. The access device 102 may include one or more antennas, for example, antennas 104, 106, 108, 110, 112, and 114. In addition, the access device 102 may additionally include a transmitter chain and a receiver chain. A person of ordinary skill in the art can understand that the transmitter chain and the receiver chain may include a plurality of components (for example, a processor, a modulator, a multiplexer, a demodulator, a demultiplexer, or an antenna) respectively related to signal sending and receiving.

The access device 102 may communicate with a plurality of terminal devices (for example, a terminal device 116 and a terminal device 122). However, it may be understood that the access device 102 may communicate with any quantity of terminal devices that are similar to the terminal device 116 or the terminal device 122. The terminal devices 116 and 122 may each be, for example, a cellular phone, a smartphone, a portable computer, a handheld communication device, a handheld computing device, a satellite radio apparatus, a global positioning system, a PDA, and/or any other suitable device configured to perform communication in the wireless communication system 100.

As shown in FIG. 1, the terminal device 116 communicates with the antennas 112 and 114. The antennas 112 and 114 send information to the terminal device 116 over a forward link (also referred to as a downlink) 118, and receive information from the terminal device 116 over a reverse link (also referred to as an uplink) 120. In addition, the terminal device 122 communicates with the antennas 104 and 106. The antennas 104 and 106 send information to the terminal device 122 through a forward link 124, and receive information from the terminal device 122 through a reverse link 126.

For example, in a frequency division duplex (FDD) system, the forward link 118 and the reverse link 120 may use different frequency bands, and the forward link 124 and the reverse link 126 may use different frequency bands.

For another example, in a time division duplex (TDD) system and a full duplex system, the forward link 118 and the reverse link 120 may use a same frequency band, and the forward link 124 and the reverse link 126 may use a same frequency band.

Each antenna (or antenna group including a plurality of antennas) and/or area designed for communication are/is referred to as a sector of the access device 102. For example, an antenna group may be designed to communicate with a terminal device in a sector within coverage of the access device 102. The access device may send signals to all terminal devices in a corresponding sector through a single antenna or a multi-antenna transmit diversity. In a process in which the access device 102 communicates with the terminal devices 116 and 122 respectively over the forward links 118 and 124, a transmit antenna of the access device 102 may improve signal-to-noise ratios of the forward links 118 and 124 through beamforming. In addition, interference to a mobile device in a neighboring cell when the access device 102 sends signals through beamforming to the terminal devices 116 and 122 that are randomly scattered in the related coverage is less than that in a manner in which an access device sends, through a single antenna or a multi-antenna transmit diversity, signals to all terminal devices served by the access device.

In a given time, the access device 102, the terminal device 116, or the terminal device 122 may be a wireless communication sending apparatus and/or a wireless communication receiving apparatus. When sending data, the wireless communication sending apparatus may encode data for transmission. Specifically, the wireless communication sending apparatus may obtain (for example, generate, receive from another communication apparatus, or store in a memory) a specific quantity of data bits to be sent on a channel to the wireless communication receiving apparatus. The data bits may be included in a transport block (or a plurality of transport blocks) of the data, and the transport block may be segmented to generate a plurality of code blocks.

In addition, the communication system 100 may be a PLMN, a device-to-device (D2D) network, a machine-to-machine (M2M) network, an IoT network, or another network. FIG. 1 is merely a simplified schematic diagram of an example. The network may further include another access device not shown in FIG. 1.

In the embodiments of this application, data or information may be carried on a time-frequency resource, and the time-frequency resource may include a time domain resource and a frequency domain resource.

In time domain, the time-frequency resource may include one or more time units. One time unit may be one symbol, one mini-slot, one slot, or one subframe. Duration of one slot in time domain may be one millisecond (ms) (when a subcarrier spacing is 15 kHz). One slot may include 14 symbols. One mini-slot may include at least one symbol (for example, two symbols, four symbols, seven symbols, or any quantity of symbols fewer than or equal to 14 symbols).

In this application, a basic unit in frequency domain is one subcarrier, and a subcarrier spacing (SCS) may be, for example, 15 kHz or 30 kHz.

At a physical layer, a unit of an uplink frequency domain resource or a downlink frequency domain resource may include a physical resource block (PRB). Each PRB includes 12 consecutive subcarriers in frequency domain.

In this application, a basic unit of a time-frequency resource may include a resource element or a resource element (RE). In other words, one RE may be a smallest physical resource, and includes one subcarrier in one OFDM symbol.

In addition, in this application, a basic time unit for resource scheduling is one slot (slot). As an example instead of a limitation, one slot includes 14 OFDM symbols in terms of time.

In time domain, a frame with a time length of 10 ms may be obtained through division, and each frame is divided into 10 subframes with a same length of 1 ms. Each subframe may include one or more slots. A quantity of slots may be determined based on a subcarrier spacing. For example, when a subcarrier spacing is 15 kHz, each subframe includes one slot.

The method in this application is applicable to a communication system that can use a DRX mechanism.

DRX enables UE to periodically enter a sleep mode and not to monitor a PDCCH. When the UE needs to monitor the PDCCH, the UE wakes up from the sleep mode. In this way, the UE can save power.

Figure 2:
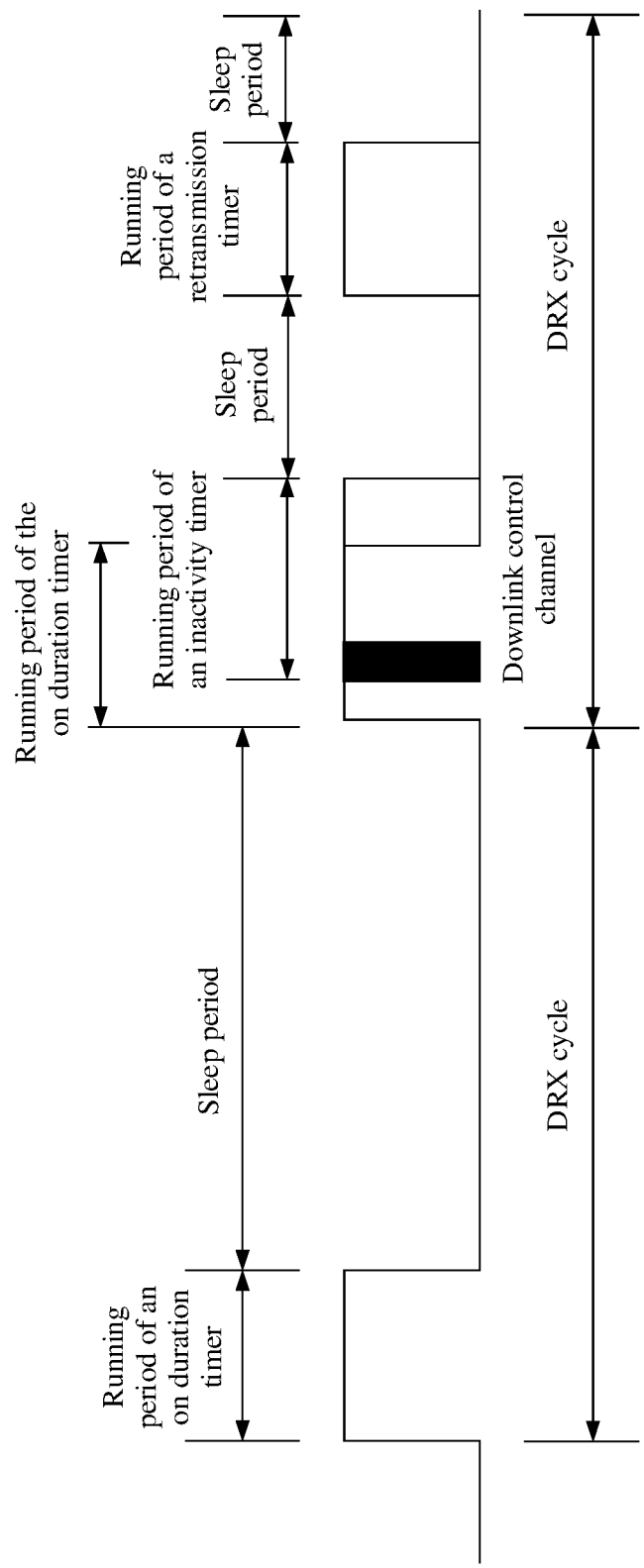
FIG. 2 is a schematic diagram of an example of a DRX configuration.

FIG. 2 shows a typical DRX cycle. As shown in FIG. 2, in this application, one DRX cycle may include an active time and a sleep time.

The active time may also be referred to as an active period, an on duration period, or an on duration time. The terminal device may communicate with the network device in the active time.

As shown in FIG. 2, in the active time, the UE listens to a downlink PDCCH subframe, and in this period of time, the UE is in a wakeup state.

The sleep time may also be referred to as an opportunity for DRX period or a sleep period. The terminal device may not transmit data in the sleep time.

As shown in FIG. 2, in the sleep time, to save power, the UE enters the sleep period and does not monitor a PDCCH slot.

It can be learned from FIG. 2 that, a longer DRX sleep time indicates lower power consumption of the UE, but correspondingly indicates an increased service transmission delay.

In the DRX mechanism, the terminal device may receive downlink data and uplink grant information in the active time. In addition, the terminal device may perform a DRX cycle based on a paging cycle in an idle mode. Alternatively, the terminal device may use a plurality of types of timers to cooperate in a radio resource control (RRC) connected mode, to ensure receiving of the downlink data and the uplink grant information. Subsequently, the foregoing timers are described in detail.

A large amount of communicated data inevitably causes a sharp increase in power consumption. Consequently, a battery supply is insufficient, or heat dissipation is increased due to the increase in the power consumption, causing a system running fault. Usage of the DRX function greatly reduces power consumption.

In this application, a DRX function control entity may be located at a MAC layer of a protocol stack. A main function of the DRX function control entity is to control sending of instructions to a physical layer, to notify the physical layer to monitor a PDCCH in a specific time. In other time, a receive antenna is not enabled, and the UE is in a sleep mode.

As an example instead of a limitation, in this application, the DRX cycle may include a short DRX cycle and a long DRX cycle.

Specifically, as described above, one DRX cycle is equal to a sum of an active time and a sleep time. In the communication system, a short DRX cycle or a long DRX cycle may be separately configured for the UE in different service scenarios. For example, when a voice service is performed, a voice codec usually sends one voice data packet every 20 milliseconds (ms). In this case, a short DRX cycle with a length of 20 ms may be configured. A long DRX cycle may be configured in a relatively long silent period during a voice call.

To be specific, if a configuration of the terminal device includes a short DRX cycle timer and a long DRX cycle timer, the terminal device runs based on the short DRX cycle, and enters a long DRX cycle running state after the short DRX cycle timer expires.

In addition, after the active time ends or the short DRX cycle timer expires, the terminal device enters a running phase of a long DRX cycle.

In this application, a start moment or a start time unit (for example, a start subframe) of the DRX cycle may be indicated by using a DRX start offset parameter. A value range of the drx start offset may be determined based on a length of the DRX cycle. For example, if the DRX cycle includes 10 subframes, the value range of the drx start offset may be 0 to 9; or if the DRX cycle includes 20 subframes, the value range of the drx start offset may be 0 to 19. For example, if a value of the drx start offset is 0, it indicates that the start subframe of the DRX cycle is the first subframe in the cycle. For example, if a value of the drx start offset is 8, it indicates that the start subframe of the DRX cycle is the ninth subframe in the cycle.

The start moment (or the start time unit) of the DRX cycle may be equal to or not equal to a start moment (or a start time unit) of the active time in the DRX cycle.

The following describes, by using examples, timers used in the DRX mechanism.

1. On Duration Timer

The on duration timer is used to enable the UE to enter the active time. In a running period of the on duration timer or before the on duration timer expires, the terminal device is in an on duration period, and the terminal device may enable a receive antenna to monitor a PDCCH.

2. DRX Inactivity Timer

Specifically, it is assumed that a slot 0 is the last subframe in the active time. In this case, a network side happens to have a large byte of data to send to the UE, and the data cannot be completely sent in the slot 0. If the on duration timer is enabled, the UE enters a DRX sleep mode in a slot 1 and does not monitor a PDCCH or receive any downlink PDSCH data from the network side. The network side can continue to send, only after the DRX cycle ends and when a next active time arrives, data that has not been transmitted to the terminal device. Although this processing mechanism is correct, a processing delay of all services is significantly increased. To avoid this situation, a drx-inactivity timer is added in the DRX mechanism. When the UE detects a PDCCH within a running time of the on duration timer, the UE starts the DRX inactivity timer. If the drx-inactivity timer is running, the UE needs to continue listening to the downlink PDCCH slot even if the configured on duration timer expires, until the drx-inactivity timer expires. After the DRX-inactivity mechanism is added, a data processing delay is significantly reduced.

3. DRX Retransmission Timer

In the DRX mechanism, a DRX retransmission timer indicates a minimum quantity of subframes or slots that the UE needs to wait before receiving expected downlink retransmission data. For FDD-LTE, a value of a HARQ RTT timer is always equal to eight subframes. For TDD-LTE, a value of a HARQ RTT timer is equal to k+4 subframes, where k indicates a delay of feedback information corresponding to downlink channel transmission. The DRX retransmission timer specifies a time length of listening to a PDCCH after the HARQ RTT timer expires, so that the UE receives data that fails to be transmitted and that needs to be retransmitted.

In this application, the active time may include a time period corresponding to a running period of at least one of the on duration timer, the drx-inactivity timer, and the DRX retransmission timer.

It should be understood that the foregoing enumerated timers are merely examples for description. This application is not limited thereto.

In an RRC connected mode, a working manner in which a timer is combined with DRX is used, and the network device also maintains a DRX working manner the same as that of the terminal device, and learns in real time whether the terminal device is in the active time or the sleep time. Therefore, it is ensured that data is transmitted in the active time, and no data is transmitted in the sleep time.

In this application, when a short DRX cycle timer runs, and when a subframe number meets a preset condition, the terminal device enters a running phase of the on duration timer and starts to monitor a PDCCH. As an example instead of a limitation, the preset condition may include but is not limited to:

[(SFN×10)+Subframe number]mod(Duration of a short DRX cycle)=(drx start offset)mod(Duration of the short DRX cycle).

SFN represents a system frame number, and drx start offset represents an offset of an active time, and is used to indicate a time unit (for example, a subframe) in a DRX cycle in which the on duration timer is started, so that the terminal device enters the active time.

A condition for entering the active timer of the on duration timer in a long DRX cycle may include but is not limited to:

[(SFN×10)+Quantity of subframes]mod(Duration of a long DRX cycle)=DRX start offset.

In this application, various timers are configured at an RRC layer. After RRC connection establishment or reestablishment is initiated, various parameters required by a MAC layer are configured by using a MAC-main configuration (MAC-MainConfig) information element, and then a running phase of a short DRX cycle or a long DRX cycle is immediately entered.

As an example instead of a limitation, configuration parameters of a DRX mode may include but is not limited to the following parameters:

Parameter a: DRX Cycle (drx-Cycle)

Specifically, the DRX cycle may be a length of the DRX cycle, for example, a length of the short DRX cycle or a length of the long DRX cycle.

Parameter b: Time Domain Position Offset of the Active Time of the DRX Mode

Specifically, for example, in this application, a start moment of an active time may overlap a start moment of a DRX cycle in which the active time is located. In this case, the time domain position offset of the active time of the DRX mode may be an offset of the start moment of the DRX cycle relative to a preset reference moment. For example, the time domain position offset of the active time of the DRX mode may indicate a start time unit (for example, a start subframe) of the DRX cycle.

It should be noted that in the communication system, a plurality of system periods in time domain may be obtained through division. The time domain position offset of the active time of the DRX mode may be an offset of a start moment of the first active time of the DRX mode relative to a start moment of a system period in which the start moment is located. That is, the preset reference moment may be the start moment of the system period in which the first active time of the DRX mode is located.

In other words, the time domain position offset of the active time of the DRX mode may be an offset indicated by the drx start offset parameter.

The active time may be a time period measured by the on duration timer.

For another example, in this application, a start moment of an active time may not overlap a start moment of a DRX cycle in which the active time is located. In this case, the time domain position offset of the active time of the DRX mode may be an offset of the active time relative to the start moment of the DRX cycle. For example, the time domain position offset of the active time of the DRX mode may indicate an offset of the active time in the DRX cycle.

The active time may include a time period corresponding to any one of the on duration timer, the drx-inactivity timer, or the HARQ RTT timer.

For another example, in this application, a start moment of an active time may be a moment satisfying a formula [(SFN×10)+Quantity of subframes]mod(Duration of a long DRX cycle)=DRX start offset.

In addition, in a DRX cycle, the terminal device needs to first wake up from a sleep mode, enable a radio frequency circuit and a baseband circuit to obtain time-frequency synchronization, and then detect a PDCCH in an "on duration" period (or a running period of an on duration timer). This process needs to consume relatively much energy. However, generally, data transmission is usually bursty and sparse in terms of time. If an access device does not schedule any data for the terminal device within the "on duration" period, unnecessary energy consumption is generated in the wake-up process. Therefore, to reduce power consumption, in this application, a wake-up signal (WUS) mechanism may be combined with a DRX mechanism in an RRC_CONNECTED mode.

Figure 3:
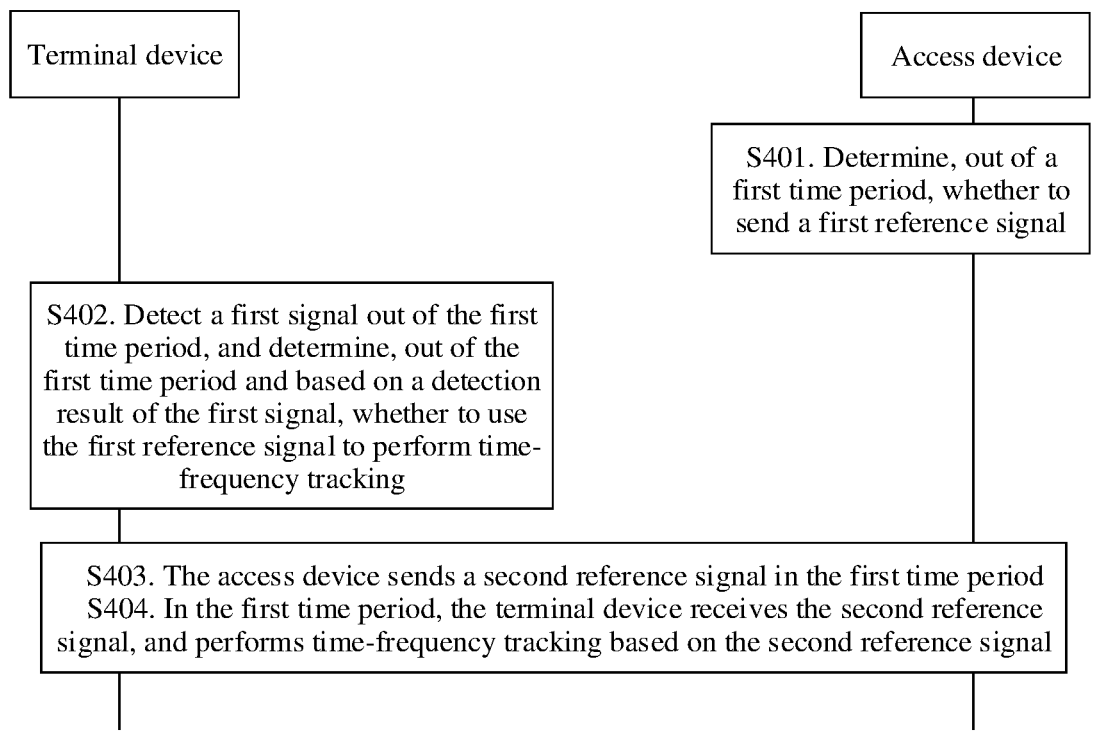
FIG. 3 is a schematic flowchart of an example of a communication process according to this application.

Referring to FIG. 3, an embodiment of a reference signal processing method includes the following steps.

S401. An access device determines, when a terminal device is out of a first time period, whether to send a first reference signal to the terminal device.

That a terminal device is out of a first time period may be understood as that the terminal device is in another time period other than a first time period.

In the following embodiment, the another time period other than the first time period is a time period #1.

In an embodiment, the first time period is a time period in which the terminal device detects a physical downlink control channel PDCCH or a physical downlink shared channel PDSCH.

For example, the first time period may be a time period other than a running period of any one of the on duration timer, the drx-inactivity timer, or the DRX retransmission timer described above.

In other words, in the first time period, any one of the on duration timer, the drx-inactivity timer, or the DRX retransmission timer is in a non-running state.

In the following embodiment, the another time period other than the first time period is a time period #2.

The first reference signal is a reference signal used for time-frequency tracking and/or channel measurement.

In an embodiment, the first reference signal is a first-type TRS (referred to as a TRS of a type #1 below for ease of understanding).

Optionally, the first reference signal may alternatively be a CSI-RS.

The first reference signal may be a common reference signal of a terminal device group, and the terminal device group includes the terminal device; or the first reference signal may be a dedicated reference signal of the terminal device.

The TRS of the type #1 may be a signal transmitted based on a DTX mechanism.

In addition, there may be a correspondence between a transmission opportunity of the TRS of the type #1 and a transmission opportunity of a first signal.

In other words, the TRS of the type #1 may be a signal detected or received based on the first signal.

The first signal may be used to wake up the terminal device.

In an embodiment, the first signal may include a wake-up signal (WUS), or may be a power saving signal.

In this application, the access device may determine, depending on whether the terminal device needs to wake up or whether the first signal is sent to the terminal device, whether to send the first reference signal to the terminal device.

For example, if the access device sends the first signal, the access device may send the first reference signal.

If the access device does not send the first signal, the access device may not send the first reference signal.

If the access device does not send the first signal, the access device may send the first reference signal.

For another example, when the first reference signal is used for demodulation and detection of the first signal, if the terminal device does not need to wake up, the access device may send the first reference signal, but does not send the first signal.

Optionally, the access device may manage a plurality of terminal devices. In this case, for example, the access device may send the first signal and the first reference signal to each terminal device (denoted as a first terminal device) in the plurality of terminal devices.

Optionally, when the first reference signals are sent to the terminal devices on a same occasion, the access device may not send the first signal and the first reference signal to one or more terminal devices (denoted as a first terminal device or first terminal devices) in the plurality of terminal devices, but the access device may send the first reference signal to another terminal device (denoted as a second terminal device). As described above, even if the first reference signals are sent to the terminal devices on a same occasion, because the first terminal device does not receive the first signal, the first terminal device does not wake up, and does not receive the first reference signal.

For another example, when TRSs are sent to terminal devices on a same occasion, if the access device determines not to send the first reference signal to a terminal device, the access device does not send the first reference signal to any terminal device managed by the access device.

Optionally, the access device may manage a plurality of terminal devices, and the plurality of terminal devices may detect a same first reference signal. In other words, the first reference signal is a common reference signal of the terminal device group. The access device may not send the first signal to one or more terminal devices (denoted as a first terminal device or first terminal devices) in the plurality of terminal devices, but the access device needs to send the first reference signal to another terminal device (denoted as a second terminal device). In this case, the access device still sends the first reference signal. However, because the first terminal device does not receive the first signal, the first terminal device does not wake up, and does not receive the first reference signal.

S402. When the terminal device is out of the first time period, the terminal device detects the first signal, and determines, based on a detection result of the first signal, whether to use the first reference signal to perform time-frequency tracking and/or channel measurement.

In an embodiment, when the terminal device detects the first signal on a first transmission occasion, the terminal device detects the first reference signal on a second transmission occasion, and uses the first reference signal to perform time-frequency tracking. When the terminal device fails to detect the first signal on the first transmission occasion, the terminal device does not detect the first reference signal on the second transmission occasion.

In another embodiment, the terminal device demodulates and detects the first signal based on the first reference signal. When the terminal device detects the first signal, the terminal device uses the first reference signal to perform time-frequency tracking. When the terminal device fails to detect the first signal, the terminal device does not use the first reference signal to perform time-frequency tracking.

S403. The access device sends a second reference signal to the terminal device when the terminal device is in the first time period, where the second reference signal is a reference signal used for time-frequency tracking and/or channel measurement.

In an embodiment, the second reference signal is a second-type TRS (referred to as a TRS of a type #2 below for ease of understanding).

Optionally, the second reference signal may be a CSI-RS.

The second reference signal is a dedicated reference signal of the terminal device.

Optionally, the second reference signal is a common reference signal of the terminal device group, and the terminal device group includes the terminal device.

S404. The terminal device receives the second reference signal when the terminal device is in the first time period.

In an embodiment, the access device periodically sends the second reference signal in the first time period, and the terminal device periodically receives the second reference signal.

In the foregoing embodiment, the access device may send two types of reference signals to the terminal device. In a time period other than the first time period, the access device may send a first-type reference signal based on a sending status of the first signal or a wake-up status of the terminal device. In the first time period, the access device may send a second-type reference signal, to flexibly cope with the terminal device in a sleep mode or not in the sleep mode. For example, if the first signal is not sent out of the first time period, the terminal device may not detect the first-type reference signal. In this case, the terminal device does not need to wake up out of the first time period because the terminal device needs to receive the first-type reference signal, so that power consumption of the terminal device can be reduced.

It should be noted that when the transmission occasion of the first reference signal is in the first time period, the terminal device does not detect the first reference signal on the transmission occasion of the first reference signal. The terminal device does not detect the second reference signal when the terminal device is out of the first time period.

In this application, the first signal may include the WUS. For ease of understanding and description, an example in which the WUS is used as the first signal is used below to describe in detail a reference signal transmission process in this application. It should be understood that the WUS is merely an example of the first signal, other signals that can wake up the terminal device (specifically, that can switch the terminal device from a sleep mode to an active mode) fall within the protection scope of this application.

Figure 4:
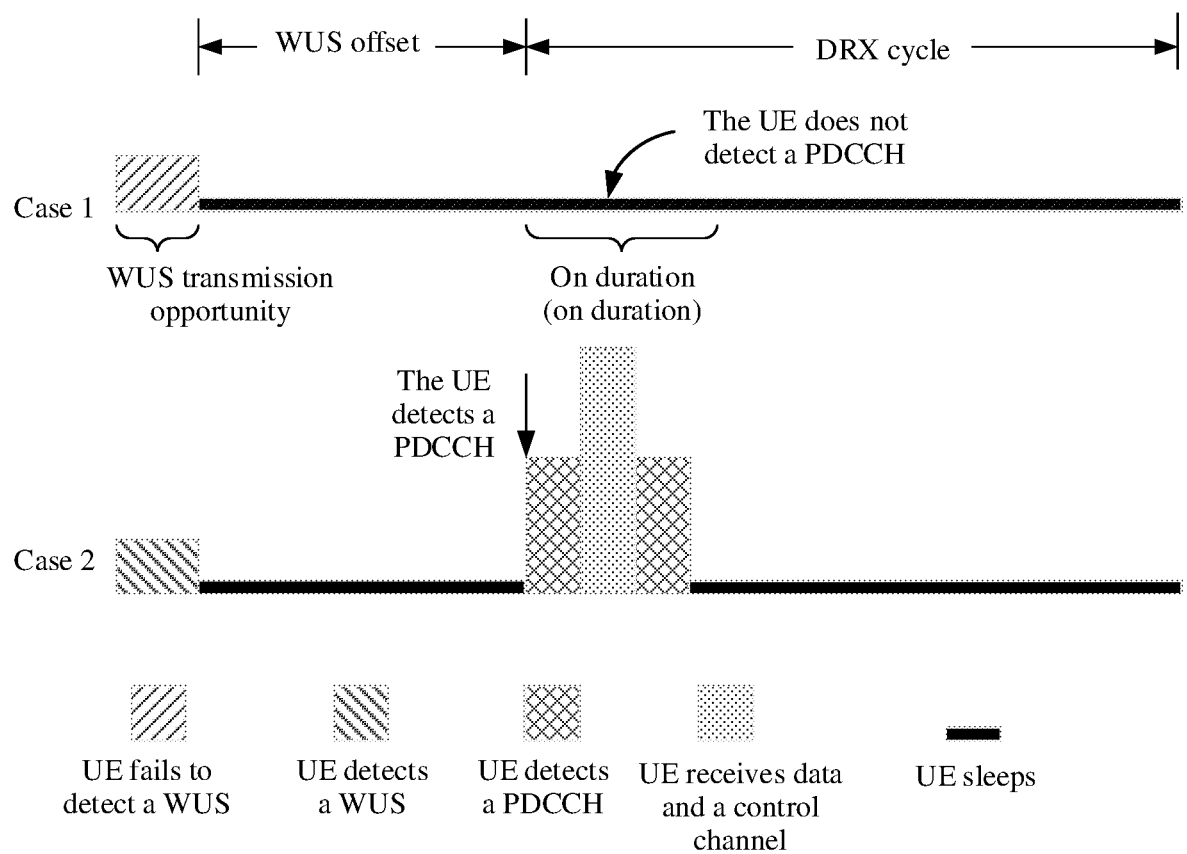
FIG. 4 is a schematic diagram of another example of a DRX configuration.

As shown in FIG. 4, for a terminal device that supports a WUS, a WUS occasion (WUS occasion) is configured before a start location of an "on duration" period (or a running period of an on duration timer) of each DRX cycle. The WUS occasion may be understood as a time-frequency resource, such as a subframe or a slot, used to transmit (or carry) a WUS.

The access device may send the WUS on the WUS occasion in a discontinuous transmission (DTX) mode. That is, the access device may determine, according to a data scheduling requirement, whether to send the WUS on the WUS occasion.

Correspondingly, the access device may receive the WUS in the DTX mode. That is, the terminal device needs to determine, by detecting the WUS on the WUS occasion, whether the access device sends the WUS.

In addition, when the terminal device "sleeps", the terminal device may detect and demodulate the WUS in a state with extremely low power consumption (where for example, only some modem functions are enabled or only a simple receive circuit is used).

As shown in FIG. 4, in a case 1, that is, when the terminal device fails to detect the WUS on the WUS occasion, or the detected WUS indicates that the terminal device has no data for scheduling in the "on duration" period (or the running period of the on duration timer) or does not need to "wake up", the terminal device may directly enter a sleep mode, in other words, the terminal device may not wake up (wake up) in the "on duration" period. That is, in this case, the terminal device does not need to detect a PDCCH in the "on duration" period, in other words, the terminal device does not need to start the foregoing DRX timer, for example, the on duration timer.

In addition, as shown in FIG. 4, in a case 2, that is, when the terminal device detects the WUS on the WUS occasion, or the detected WUS indicates that the UE has data for scheduling in the "on duration" period or needs to "wake up", the terminal device may wake up from a sleep mode. That is, in this case, the terminal device may start a timer, for example, the on duration timer, according to the foregoing DRX mechanism procedure, to detect a PDCCH.

In addition, this application may be applied to a tracking reference signal (TRS). Specifically, in this application, downlink transmission may be performed between the access device and the terminal device by using, for example, a physical downlink shared channel (PDSCH) and a physical downlink control channel (PDCCH). To correctly receive the PDSCH, the terminal device needs to first demodulate the PDCCH, where downlink control information (DCI) carried on the PDCCH includes related information required for receiving the PDSCH, for example, a location and a size of a PDSCH time-frequency resource, and multi-antenna configuration information.

Due to a disadvantage of a crystal oscillator or the like, the terminal device needs to track and compensate for time and frequency variations (or offsets), to correctly receive downlink data. To assist the terminal device in performing time-frequency tracking, the access device may send a TRS to the terminal device. That is, the TRS may be used to correct an inter-symbol phase error, and the TRS may also be used to track a Doppler channel and a time-varying channel.

In this application, the TRS may include the TRS of the type #1 and the TRS of the type #2. However, it should be noted that this application may also be applicable to a CSI-RS, including a CSI-RS of a type #1 and a CSI-RS of a type #2, and the method is similar.

In addition, in this application, the first reference signal may include the TRS of the type #1. For ease of understanding and description, an example in which the TRS of the type #1 is used as the first reference signal is used below to describe in detail a reference signal transmission process in this application. It should be understood that, the TRS of the type #1 is merely an example of the first reference signal, and another reference signal that can be used by the terminal device to perform time-frequency tracking and/or channel measurement when the terminal device is in an inactive period (or out of the first time period) falls within the protection scope of this application.

In addition, in this application, the second reference signal may include the TRS of the type #2. For ease of understanding and description, an example in which the TRS of the type #2 is used as the second reference signal is used below to describe in detail a reference signal transmission process in this application. It should be understood that, the TRS of the type #2 is merely an example of the second reference signal, and another reference signal that can be used by the terminal device to perform time-frequency tracking and/or channel measurement when the terminal device is in the active period (or the first time period) falls within the protection scope of this application.

The following describes the two types of TRSs in detail.

A. TRS of the Type 1

Specifically, the TRS of the type #1 may be a TRS transmitted between the terminal device and the access device in the time period #1.

The time period #1 may include a time period other than an active time of a DRX cycle of the terminal device.

In other words, the terminal device is not in a wake-up (or active) mode in the time period #1. In other words, the terminal device does not detect the PDCCH in the time period #1.

For example, the time period #1 may be a time period other than the running period of any one of the on duration timer, the drx-inactivity timer, or the DRX retransmission timer.

In other words, in the time period #1, any one of the on duration timer, the drx-inactivity timer, or the DRX retransmission timer is in a non-running state.

In this application, the time period #1 may be a time period other than the time period #2.

The time period #2 may include a time period in the active time of the DRX cycle of the terminal device.

In other words, the terminal device is in a wake-up (or active) state in the time period #2. In other words, the terminal device needs to detect the PDCCH in the time period #2.

For example, the time period #2 may include a time period in the running period of at least one of the on duration timer, the drx-inactivity timer, or the DRX retransmission timer.

In other words, in the time period #2, at least one of the on duration timer, the drx-inactivity timer, or the DRX retransmission timer is in a running state.

The following describes a transmission mode of the TRS of the type #1.

The TRS of the type #1 may be a signal transmitted based on a DTX mechanism.

In addition, there may be a correspondence between a transmission opportunity (that is, the second transmission occasion) of the TRS and a transmission opportunity (that is, the first transmission occasion) of the WUS.

For example, a transmission moment (denoted as a moment #A) of the TRS of the type #1 may appear periodically.

The transmission moment may also be referred to as a transmission opportunity or a transmission occasion. In other words, the moment #A may be a moment corresponding to a transmission opportunity of the TRS of the type #1.

In this application, a cycle for the moment #A may be corresponding to a cycle for a moment #B.

The moment #B is a transmission moment of the WUS.

In other words, the moment #B may be a moment corresponding to a transmission opportunity of the WUS.

For example, the cycle for the moment #A may be the same as the cycle for the moment #B.

For another example, the cycle for the moment #A may be an integer multiple of the cycle for the moment #B.

For another example, the cycle for the moment #B may be an integer multiple of the cycle for the moment #A.

Optionally, a cycle for the moment #A may be corresponding to a DRX cycle.

That is, in this application, the cycle for the moment #A may be corresponding to a cycle for a moment #C.

The moment #C is a start moment of an on duration (on duration) period of WUS-based DRX, or the moment #C is a moment of starting an on duration timer.

For example, the cycle for the moment #A may be the same as the cycle for the moment #C, and the cycle for the moment #C may be the DRX cycle. That is, the cycle for the moment #A is the same as the DRX cycle.

As an example instead of a limitation, the moment #A and the moment #B may have any one of the following relationships. In other words, the TRS of the type #1 may be transmitted in any one of the following manners.

Manner A:

As an example instead of a limitation, for a moment #A and a moment #B that are corresponding to a same cycle, the moment #A and the moment #B may be corresponding to different time units (for example, slots), that is, the moment #B may be located before the moment #A, or a time unit (for example, a slot) in which the moment #B is located may precede a time unit (for example, a slot) in which the moment #A is located. In other words, in this application, the transmission opportunity of the WUS is before the transmission opportunity of the first-type TRS.

That is, there is a time interval #X between the moment #A and the moment #B.

The time interval #X may be pre-specified in a communication system or a communication protocol.

Alternatively, the time interval #X may be preconfigured by the access device.

Optionally, for a moment #A and a moment #C in a same cycle, the moment #A may precede the moment #C.

That is, there is a time interval #Y between the moment #A and the moment #C.

The time interval #Y may be pre-specified in a communication system or a communication protocol.

Alternatively, the time interval #Y may be preconfigured by the access device.

Figure 5:
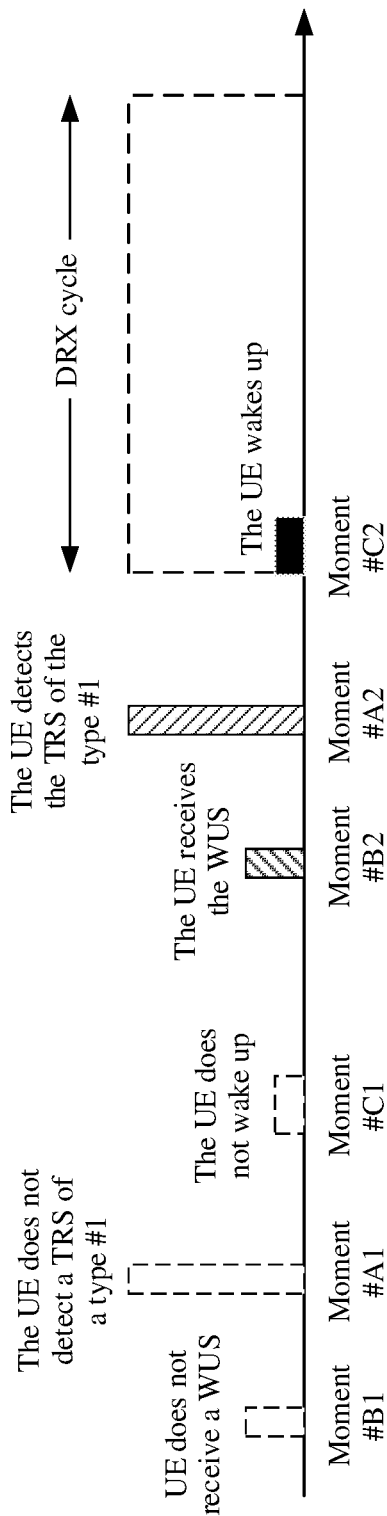
FIG. 5 is a schematic diagram of an example of a transmission mode of a type #1 TRS according to this application.

FIG. 5 is a schematic diagram of a TRS transmission mode in the manner A.

As shown in FIG. 5, a moment #B1 and a moment #B2 are transmission opportunities of the WUS. For example, it is assumed that the access device does not send the WUS at the moment #B1, and the access device sends the WUS at the moment #B2.

In addition, as shown in FIG. 5, a moment #A1 and a moment #A2 are transmission opportunities of the TRS of the type #1.

In addition, there is a time interval #X between the moment #A1 and the moment #B1. There is the time interval #X between the moment #A2 and the moment #B2.

First, a processing process at the moment #A1 is described.

As described above, the access device may not send the WUS at the moment #B1.

Correspondingly, because the terminal device does not detect the WUS at the moment #B1, the terminal device does not receive (or detect) the TRS at the moment #A1. In other words, the terminal device determines that the access device does not send the TRS at the moment #A1. In other words, the terminal device determines that a TRS sent by the access device at the moment #A1 is not the TRS sent to the terminal device.

It should be noted that, although the terminal device does not receive (or detect) the TRS at the moment #A1, the access device may send the TRS of the type #1 at the moment #A1.

In other words, in this application, one TRS of the type #1 may be reused by a terminal device group including a plurality of terminal devices.

For example, it is assumed that a terminal device #1 and a terminal device #2 belong to a same terminal device group, the access device sends the WUS to the terminal device #1 at the moment #B1, and the access device does not send the WUS to the terminal device #2 at the moment #B1.

In this case, the access device may send the TRS of the type #1 at the moment #A1. In addition, after receiving the WUS at the moment #B1, the terminal device #1 may determine that the TRS needs to be detected at the moment #A1. In contrast, after the terminal device #2 does not receive the WUS at the moment #B1, the terminal device #2 may determine that the terminal device #2 does not need to detect the TRS at the moment #A1. In this case, the terminal device #2 may enter a "sleep" state.

Alternatively, because the WUS is not sent at the moment #B1, the access device may choose not to send the TRS of the type #1 to the terminal device at the moment #A1. In other words, if the access device determines that the access device does not need to send the TRS at the moment #A1, the access device may not send the WUS at the moment #B1.

The foregoing lists processing cases in which the moment #A and the moment #B are corresponding to different time units. However, this is not limited in this application. The moment #A and the moment #B may also be corresponding to a same time unit (for example, a slot). In other words, the moment #B may be the same as the moment #A. That is, in this application, the transmission opportunity of the WUS and the transmission opportunity of the first-type TRS are corresponding to a same time unit. In this case, the terminal device may store related data of a signal received in the same time unit, and after analyzing, based on the related data of the signal, that the access device sends the WUS, the terminal device obtains the TRS of the type #1 based on the related data of the signal. To avoid repetition, descriptions for a same or similar case are omitted below.

A processing process at the moment #A2 is described below.

As described above, because the WUS is sent at the moment #B2, the access device may send the TRS of the type #1 at the moment #A2.

In other words, if the access device determines that the access device needs to send the TRS at the moment #A2, the access device may send the WUS at the moment #B2.

Correspondingly, because the terminal device detects the WUS at the moment #B2, the terminal device needs to receive (or detect) the TRS at the moment #A2.

After receiving the TRS, the terminal device may use the TRS to perform time-frequency tracking. Optionally, the terminal device may further use the TRS to perform channel measurement.

As an example instead of a limitation, the TRS of the type #1 may be a resource set that includes a plurality of periodic non-zero power channel state information reference signals (NZP-CSI-RS).

Figure 6:
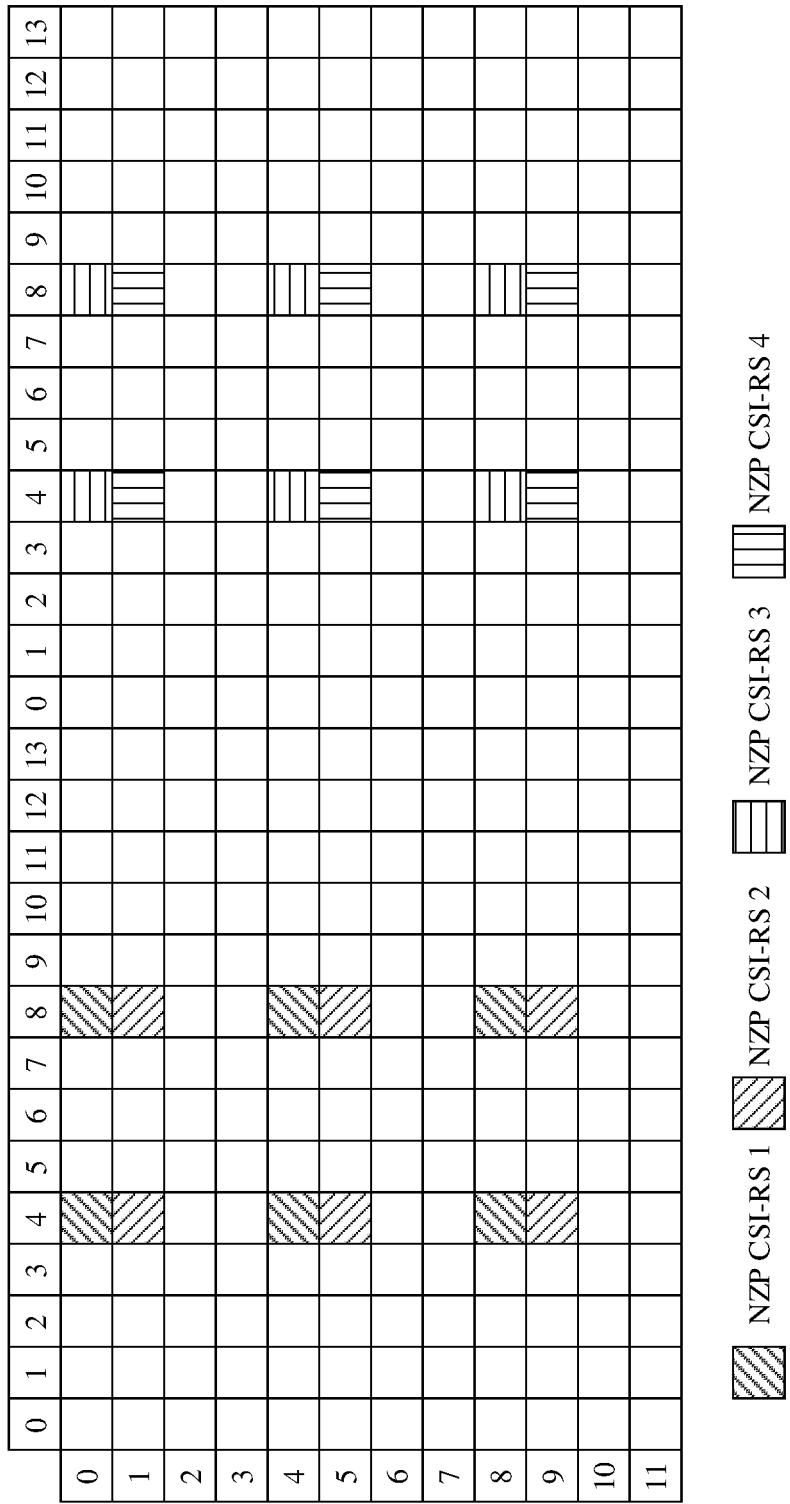
FIG. 6 is a schematic diagram of an example of a configuration of a TRS and a WUS in the transmission mode shown in FIG. 5.

For example, the TRS of the type #1 may include four NZP-CSI-RSs, and the four NZP-CSI-RSs are located on four OFDM symbols in two consecutive slots, and periodicities of the four OFDM symbols may be configured as 10 ms, 20 ms, 40 ms, or 80 ms. The four NZP-CSI-RSs have a same periodicity and bandwidth, each NZP-CSI-RS occupies two OFDM symbols, and OFDM symbol locations of the four NZP-CSI-RSs in a slot are the same, and may be configured as $l \in \{4,8\}$, $l \in \{6,10\}$, or $l \in \{5,9\}$, where l is an OFDM index number. In addition, in frequency domain, each NZP-CSI-RS occupies three REs on an OFDM symbol in each PRB. For example, a structure of the TRS of the type #1 may be shown in FIG. 6.

Manner B

As an example instead of a limitation, for a moment #A and a moment #B that are corresponding to a same cycle, the moment #A and the moment #B may be corresponding to a same time unit (for example, a slot).

In other words, for the moment #A and the moment #B that are corresponding to a same cycle, the moment #A and the moment #B may be the same.

Optionally, in this case, the TRS of the type #1 may be used for demodulation of the WUS.

Figure 7:
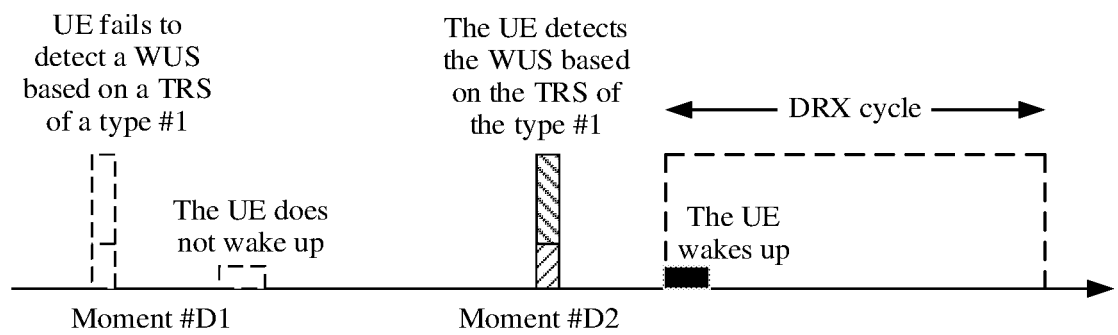
FIG. 7 is a schematic diagram of another example of a transmission mode of a type #1 TRS according to this application.

FIG. 7 is a schematic diagram of a TRS transmission mode in the manner B.

As shown in FIG. 7, a moment #D1 and a moment #D2 are transmission opportunities of the WUS and the TRS. In addition, the access device does not send the WUS at the moment #D1, and sends the TRS of the type #1 and the WUS at the moment #D2.

First, a processing process at the moment #D1 is described.

As described above, the access device may not send the WUS at the moment #D1.

The terminal device may assume that the access device sends the TRS of the type #1 and the WUS at the moment #D1, so that the terminal device can demodulate the WUS at the moment #D1 based on the TRS of the type #1. When demodulation fails, if the TRS of the type #1 is a TRS specific to the terminal device, the terminal device may determine that the access device does not send the TRS of the type #1 and the WUS at the moment #D1. If the TRS of the type #1 is a common reference signal of the terminal device group, the access device may send the TRS of the type #1 at the moment #D1, or may not send the TRS of the type #1 at the moment #D1, but the terminal device may determine that the WUS is not sent at the moment #D1. Provided that the terminal device determines that the WUS is not sent at the moment #D1, the terminal device may continue to enter a "sleep" state, and does not need to perform time-frequency tracking or channel measurement.

In other words, the terminal device determines that a TRS sent by the access device at the moment #D1 is not the TRS sent to the terminal device.

It should be noted that, although the terminal device considers that the access device does not send the TRS of the type #1 and the WUS at the moment #D1, the access device may send the TRS of the type #1 at the moment #D1.

In other words, in this application, one TRS of the type #1 may be reused by a terminal device group including a plurality of terminal devices.

For example, it is assumed that a terminal device #1 and a terminal device #2 belong to a same terminal device group, the access device sends the WUS to the terminal device #1 at the moment #D1, and the access device does not send the WUS to the terminal device #2 at the moment #D1.

In this case, the access device may send the TRS of the type #1 at the moment #D1. In addition, the terminal device #1 can obtain the WUS through demodulation based on the TRS of the type #1 at the moment #D1, and may determine that the access device sends the TRS and the WUS at the moment #D1. In contrast, the terminal device #2 cannot obtain the WUS through demodulation based on the TRS of the type #1 at the moment #D1, and may determine that the access device does not send the WUS at the moment #D1. In this case, the terminal device may directly enter a "sleep" state instead of using the TRS of the type #1 to perform time-frequency tracking or channel measurement.

A processing process at the moment #D2 is described below.

As described above, the access device may send the WUS at the moment #D2.

The terminal device may assume that the access device sends the TRS of the type #1 and the WUS at the moment #D2, so that the terminal device can demodulate the WUS at the moment #D2 based on the TRS of the type #1. Because the demodulation succeeds, the terminal device can determine that the access device sends the TRS of the type #1 and the WUS at the moment #D2.

After detecting the WUS, the terminal device may use the TRS of the type #1 to perform time-frequency tracking. Optionally, the terminal device may further use the TRS to perform channel measurement.

In this application, the WUS may be designed in a form similar to a PUCCH format 0. To be specific, a relatively small bandwidth (for example, one or two RBs in frequency domain) is occupied, a relatively small quantity of OFDM symbols (for example, one or two OFDM symbols) are used in time domain, and the WUS is in a sequence form (for example, a length is 12 or 24).

Figure 8:
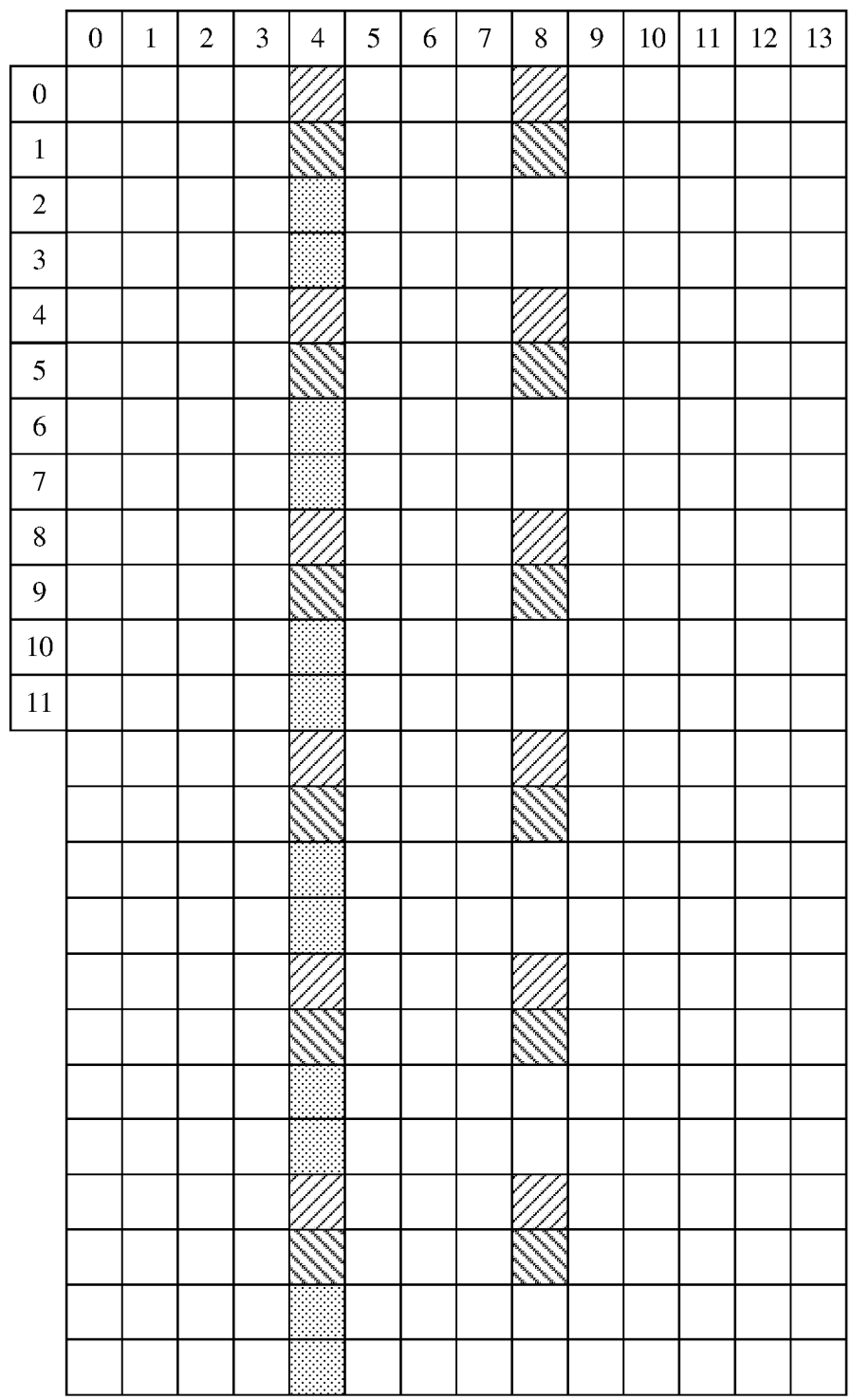
FIG. 8 is a schematic diagram of an example of a configuration of a TRS and a WUS in the transmission mode shown in FIG. 7.

As an example instead of a limitation, in this application, the WUS and the TRS of the type #1 may be located on a same OFDM symbol. A possible WUS design is shown in FIG. 8. In the figure, an NZP CSI-RS 1 and an NZP CSI-RS 2 are two of four NZP CSI-RSs that form a TRS. The WUS occupies 12 REs.

B. TRS of the Type 2

Specifically, the TRS of the type #2 may be a TRS transmitted between the terminal device and the access device in the time period #2.

The time period #2 may include a time period in the active time of the DRX cycle of the terminal device.

In other words, the terminal device is in a wake-up (or active) state in the time period #2. In other words, the terminal device needs to detect the PDCCH in the time period #2.

For example, the time period #2 may include a time period in the running period of at least one of the on duration timer, the drx-inactivity timer, or the DRX retransmission timer.

In other words, in the time period #2, at least one of the on duration timer, the drx-inactivity timer, or the DRX retransmission timer is in a non-running state.

In this application, the TRS of the type #2 may be a periodically transmitted TRS.

For example, as an example instead of a limitation, a periodicity (for example, a size of the periodicity and/or a start moment of the periodicity) of the TRS of the type #2 may be specified in a communication protocol.

Alternatively, a periodicity (for example, a size of the periodicity and/or a start moment of the periodicity) of the TRS of the type #2 may be preconfigured by the access device, and may be configured by using higher layer signaling.

Figure 9:
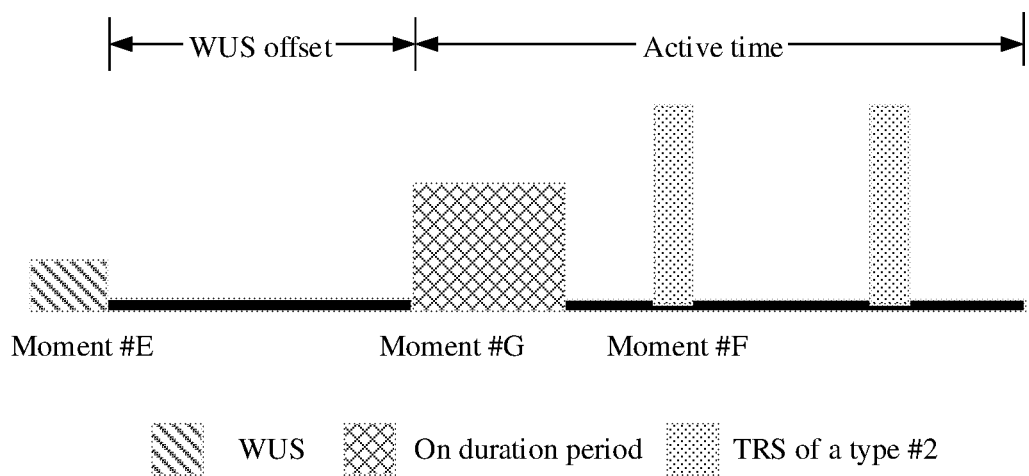
FIG. 9 is a schematic diagram of an example of a transmission mode of a type #2 TRS according to this application.

FIG. 9 is a schematic diagram of a transmission mode of the TRS of the type #1.

As shown in FIG. 9, it is assumed that the terminal device enters an active time because the terminal device receives the WUS at a moment #E.

It is assumed that a sending moment of the first TRS of the type #2 in the active time is a moment #F.

In this case, there may be a specified time interval #Y between the moment #F and the moment #E.

The time interval #Y may be pre-specified in a communication system or a communication protocol.

Alternatively, the time interval #Y may be preconfigured by the access device.

For another example, it is assumed that a start moment of an on duration (on duration) period in the active time is a moment #G, or it is assumed that a start moment of an on duration timer in the active time is a moment #G.

In this case, there may be a specified time interval #Z between the moment #F and the moment #G.

The time interval #Z may be pre-specified in a communication system or a communication protocol.

Alternatively, the time interval #Z may be preconfigured by the access device.

As an example instead of a limitation, the TRS of the type #1 may be a resource set including a plurality of periodic NZP-CSI-RSs. For example, the TRS of the type #1 may include four NZP-CSI-RSs, and the four NZP-CSI-RSs are located on four OFDM symbols in two consecutive slots, and periodicities of the four OFDM symbols may be configured as 10 ms, 20 ms, 40 ms, or 80 ms. The four NZP-CSI-RSs have a same periodicity and bandwidth, each NZP-CSI-RS occupies two OFDM symbols, and OFDM symbol locations of the four NZP-CSI-RSs in a slot are the same, and may be configured as l∈{4,8}, l∈{6,10}, or l∈{5,9}, where l is an OFDM index number. In addition, in frequency domain, each NZP-CSI-RS occupies three REs on an OFDM symbol in each PRB. For example, a structure of the TRS of the type #2 may be shown in FIG. 6.

Figure 10:
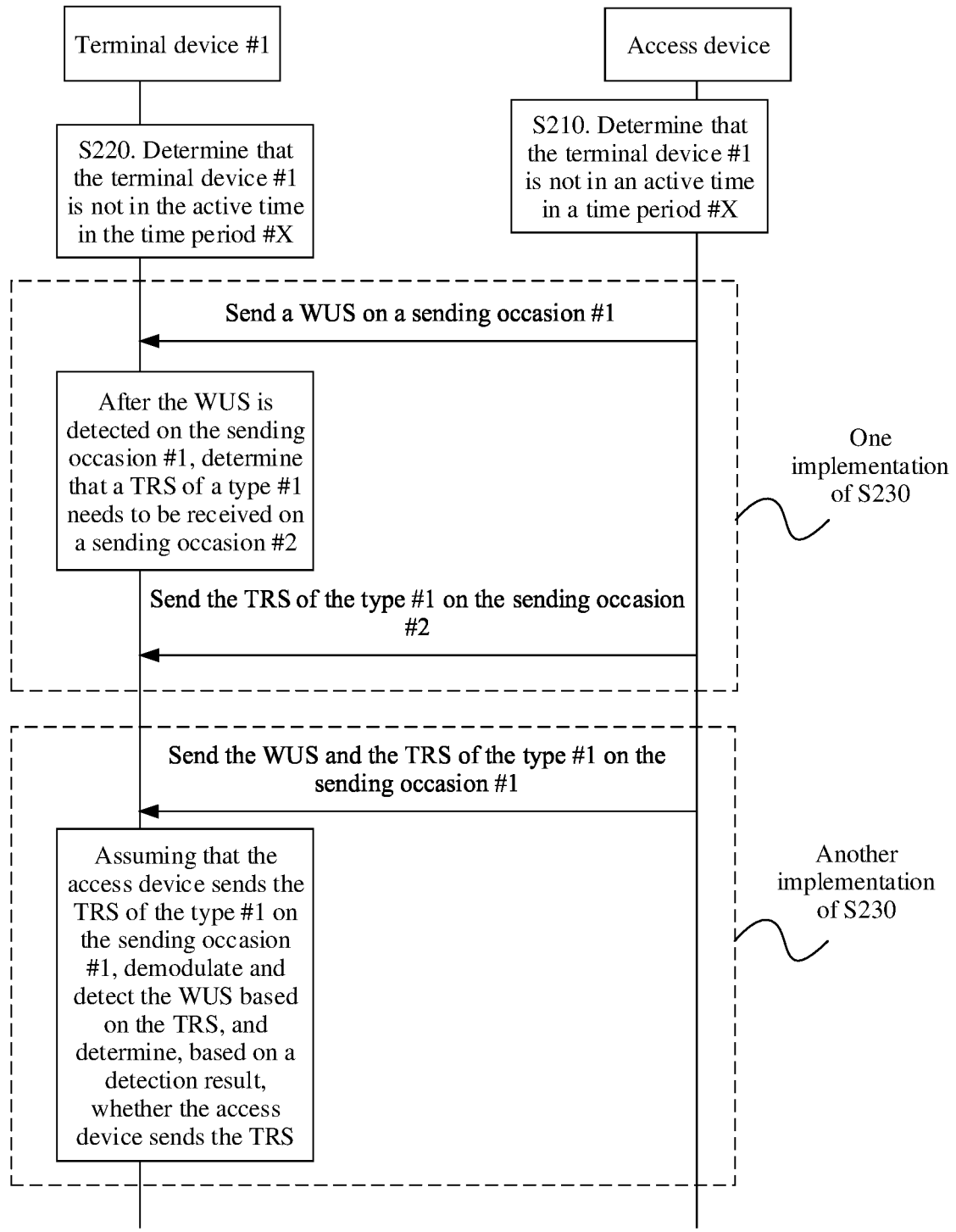
FIG. 10 is a schematic flowchart of an example of a TRS sending process according to this application.

FIG. 10 shows an example of a transmission process of a TRS (that is, an example of a reference signal) between an access device and a terminal device #1 (that is, an example of a terminal device). As shown in FIG. 10, in S210, the access device may determine whether the terminal device #1 is currently in an active time. In other words, in S210, the access device may determine whether the terminal device #1 is in the active time in a time period #X.

For example, the access device may perform a determining process of S210 based on sending statuses of a WUS and a PDCCH.

For example, after sending the WUS, the access device may determine an on duration (on duration) period of the terminal device #1 or a running period of an on duration timer based on a sending moment of the WUS.

For another example, after sending the PDCCH, the access device may determine a running period of a drx-inactivity timer based on a sending moment of the PDCCH.

For another example, the access device may determine a running period of a DRX retransmission timer based on a receiving status of downlink data of the terminal device #1.

If the receiving device determines that the terminal device is not in the running period of any one of the on duration timer, the drx-inactivity timer, or the DRX retransmission timer at a current moment, the access device may determine that the terminal device #1 is not in the active time currently, that is, a determining result in S210 is "no".

Alternatively, if the receiving device determines that the terminal device #1 is not in the running period of any one of the on duration timer, the drx-inactivity timer, or the DRX retransmission timer in the time period #X, the access device may determine that the terminal device #1 is not in the active time in the time period #X, that is, a determining result in S210 is "no".

Therefore, in S230, the access device may send a TRS (namely, an example of a first reference signal) of a type #1 in the time period #X.

Optionally, the TRS of the type #1 may be a CSI-RS.

The TRS of the type #1 may be a common reference signal of a terminal device group, and the terminal device group includes the terminal device, or the TRS of the type #1 may be a dedicated reference signal of the terminal device.

Similarly, in S220, the terminal device #1 may determine whether the terminal device #1 is currently in the active time. In other words, in S220, the terminal device #1 may determine whether the terminal device #1 is currently in the active time in the time period #X.

For example, the terminal device #1 may perform a determining process of S220 based on receiving statuses of the WUS (namely, an example of a first signal) and the PDCCH.

Optionally, the first signal may include a wake-up signal (WUS), or may be a power saving signal.

In this application, the WUS may be designed in a form similar to a PUCCH format 0. To be specific, a relatively small bandwidth (for example, one or two RBs in frequency domain) is occupied, a relatively small quantity of OFDM symbols (for example, one or two OFDM symbols) are used in time domain, and the WUS is in a sequence form (for example, a length is 12 or 24).

As an example instead of a limitation, in this application, the WUS and the TRS of the type #1 may be located on a same OFDM symbol. A possible WUS design is shown in FIG. 8. In the figure, an NZP CSI-RS 1 and an NZP CSI-RS 2 are two of four NZP CSI-RSs that form a TRS. The WUS occupies 12 REs.

For example, after receiving the WUS, the terminal device #1 may determine an on duration (on duration) period of the terminal device #1 or a running period of an on duration timer based on a receiving moment of the WUS.

For another example, after receiving the PDCCH, the terminal device #1 may determine a running period of a drx-inactivity timer based on a receiving moment of the PDCCH.

For another example, the terminal device #1 may determine a running period of a DRX retransmission timer based on a receiving status of downlink data of the terminal device #1.

If the terminal device #1 determines that the terminal device #1 is not in the running period of any one of the on duration timer, the drx-inactivity timer, or the DRX retransmission timer at a current moment, the terminal device #1 may determine that the terminal device #1 is not in the active time currently, that is, a determining result in S220 is "no".

Alternatively, if the terminal device #1 determines that the terminal device #1 is not in the running period of any one of the on duration timer, the drx-inactivity timer, or the DRX retransmission timer in the time period #X, the terminal device #1 may determine that the terminal device #1 is not in the active time in the time period #X, that is, a determining result in S220 is "no".

Therefore, in S230, the terminal device #1 may receive the TRS of the type #1 in the time period #X.

In this application, there is a case (namely, a case ∩1) in which the access device needs to send the WUS to the terminal device #1 and a case (namely, a case #2) in which the access device does not need to send the WUS to the terminal device #1. The following separately describes in detail transmission processes in the foregoing two cases.

Case 1

For example, the access device may send a WUS #1 (that is, an example of the first signal) on a sending occasion #1 in the time period #X, and the access device may send a TRS (specifically, the TRS of the type #1) on a sending occasion #2 in the time period #X. There may be a preset time interval between the moment #1 and the moment #2.

The WUS #1 may be a dedicated signal of the terminal device #1. For example, the sending occasion #1 may be an occasion on which the terminal device #1 receives the WUS.

Alternatively, the WUS #1 may be a dedicated signal of a terminal device group #A to which the terminal device #1 belongs. For example, the sending occasion #1 may be an occasion on which a terminal device in the terminal device group #A receives the WUS.

In this case, after the terminal device #1 detects the WUS #1 on the sending occasion #1, the terminal device #1 may receive the TRS (specifically, the TRS of the type #1) on the sending occasion #2 in the time period #X, and perform time-frequency tracking based on the TRS.

For another example, the access device may send the WUS and the TRS of the type #1 on the sending occasion #1 in the time period #X.

In this case, the terminal device #1 may assume that the access device sends the TRS (specifically, the TRS of the type #1) on the sending occasion #1, and then the access device may demodulate and detect the WUS based on the TRS. For example, the terminal device #1 may perform channel estimation based on the TRS, and detect the WUS based on a result of the channel estimation. Because the access device actually sends the WUS and the TRS, the terminal device #1 can detect the WUS and the TRS on the sending occasion #1.

It should be noted that the foregoing listed transmission process of the TRS of the type #1 is merely an example for description, and this application is not limited thereto. A method for transmitting the TRS of the type #1 may be similar to the method for transmitting the TRS of the type #1 shown in FIG. 5 to FIG. 8. To avoid repetition, detailed descriptions thereof are omitted.

Case 2

For example, the TRS of the type #1 may be a dedicated TRS of the terminal device #1.

In this case, for example, the access device does not send the WUS #1 on the sending occasion #1 in the time period #X. Therefore, the access device may not send the TRS (specifically, the TRS of the type #1) on the sending occasion #2 in the time period #X. Therefore, because the terminal device #1 fails to detect the WUS #1 on the sending occasion #1, the terminal device #1 does not detect the TRS (specifically, the TRS of the type #1) on the sending occasion #2 in the time period #X.

For another example, the access device may not send the WUS and the TRS of the type #1 on the sending occasion #1 in the time period #X.

In this case, the terminal device #1 may assume that the access device sends the TRS (specifically, the TRS of the type #1) on the sending occasion #1, and then the access device may demodulate and detect the WUS based on the TRS. For example, the terminal device #1 may perform channel estimation based on the TRS, and detect the WUS based on a result of the channel estimation. Because the access device #1 actually does not send the WUS and the TRS, the terminal device #1 cannot detect the WUS, and further, the terminal device #1 may determine that the access device does not send the TRS.

For another example, the TRS of the type #1 may be a dedicated TRS of a terminal device group #A to which the terminal device #1 belongs.

In this case, for example, the access device does not send the WUS #1 on the sending occasion #1 in the time period #X, and the access device sends the TRS (specifically, the TRS of the type #1) on the sending occasion #1 in the time period #X.

In this case, the terminal device #1 may assume that the access device sends the TRS (specifically, the TRS of the type #1) on the sending occasion #1, and then the access device may demodulate and detect the WUS based on the TRS. For example, the terminal device #1 may perform channel estimation based on the TRS, and detect the WUS based on a result of the channel estimation. Because the access device #1 actually does not send the WUS, the terminal device #1 cannot detect the WUS, and further, the terminal device #1 may determine that the access device does not send the TRS.

After detecting the WUS, the terminal device may use the TRS of the type #1 to perform time-frequency tracking. Optionally, the terminal device may further use the TRS to perform channel measurement. Alternatively, the terminal device uses the TRS to perform time-frequency tracking and channel measurement.

In this application, the WUS may be designed in a form similar to a PUCCH format 0. To be specific, a relatively small bandwidth (for example, one or two RBs in frequency domain) is occupied, a relatively small quantity of OFDM symbols (for example, one or two OFDM symbols) are used in time domain, and the WUS is in a sequence form (for example, a length is 12 or 24).

In addition, for another terminal device (denoted as a terminal device #2) in the terminal device group #A, if the access device needs to send the WUS and the TRS to the terminal device #2 in the time period #X, the access device may send a WUS #2 and the TRS on the sending occasion #1. In this case, the terminal device #2 may demodulate and detect the WUS #2 based on the TRS.

It should be noted that the foregoing listed transmission process of the TRS of the type #1 is merely an example for description, and this application is not limited thereto. A method for transmitting the TRS of the type #1 may be similar to the method for transmitting the TRS of the type #1 shown in FIG. 5 to FIG. 8. To avoid repetition, detailed descriptions thereof are omitted.

In addition, in this application, the access device may manage transmission processes of WUSs and TRSs of a plurality of terminal devices including the terminal device #1 or the terminal device #2.

For example, the access device may send the WUS and the TRS to the terminal device #1.

For another example, when TRSs of terminal devices are sent on a same occasion, the access device may not send the WUS and the TRS to the terminal device #1 (or a terminal device group to which the terminal device #1 belongs), but the access device may send the TRS to another terminal device (denoted as a terminal device #4). As described above, even if the TRSs of the terminal devices are sent on a same occasion, because the terminal device #1 does not receive the WUS, the terminal device #1 does not wake up, and does not receive the TRS of the type #1.

For another example, when TRSs of terminal devices are sent on a same occasion, if the access device determines not to send the WUS and the TRS to the terminal device #1 (or a terminal device group to which the terminal device #1 belongs), the access device does not send the WUS and the TRS of the type #1 to any terminal device managed by the access device.

Figure 11:
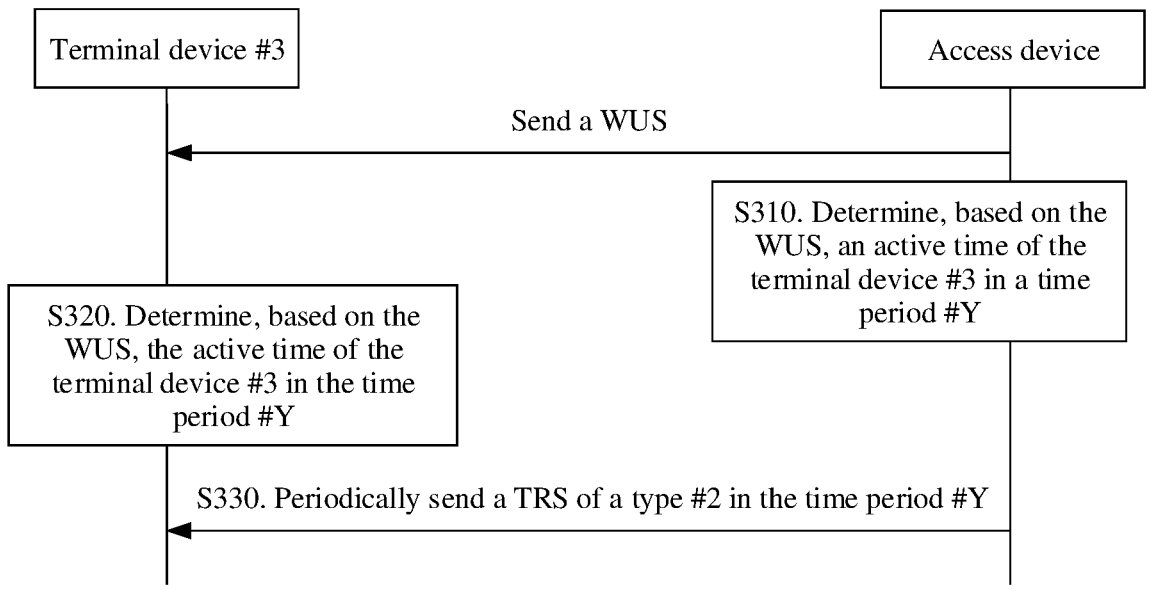
FIG. 11 is a schematic flowchart of an example of a TRS receiving process according to this application.

FIG. 11 shows an example of a transmission process of a TRS (that is, an example of a reference signal) between an access device and a terminal device #1 (that is, an example of a terminal device). As shown in FIG. 11, in S310, the access device may determine whether the terminal device #3 is currently in an active time. In other words, in S310, the access device may determine whether the terminal device #3 is in the active time in a time period #Y currently.

For example, the access device may perform a determining process of S310 based on sending statuses of a WUS and a PDCCH.

For example, after sending the WUS, the access device may determine an on duration (on duration) period of the terminal device #3 or a running period of an on duration timer based on a sending moment of the WUS.

For another example, after sending the PDCCH, the access device may determine a running period of a drx-inactivity timer based on a sending moment of the PDCCH.

For another example, the access device may determine a running period of a DRX retransmission timer based on a receiving status of downlink data of the terminal device #3.

If the receiving device determines that the terminal device is not in the running period of any one of the on duration timer, the drx-inactivity timer, or the DRX retransmission timer at a current moment, the access device may determine that the terminal device #3 is not in the active time currently, that is, a determining result in S310 is "no".

Alternatively, if the receiving device determines that the terminal device #3 is not in the running period of any one of the on duration timer, the drx-inactivity timer, or the DRX retransmission timer in the time period #Y, the access device may determine that the terminal device #3 is not in the active time in the time period #Y, that is, a determining result in S310 is "no".

Therefore, in S330, the access device may send a TRS (namely, an example of a second reference signal) of a type #2 in the time period #Y.

Optionally, the second reference signal may be a CSI-RS.

The second reference signal is a dedicated reference signal of the terminal device.

Optionally, the second reference signal is a common reference signal of the terminal device group, and the terminal device group includes the terminal device.

Similarly, in S320, the terminal device #3 may determine whether the terminal device #3 is currently in the active time. In other words, in S320, the terminal device #3 may determine whether the terminal device #3 is in the active time in the time period #Y.

For example, the terminal device #3 may perform a determining process of step 320 based on receiving statuses of the WUS and the PDCCH.

For example, after receiving the WUS (that is, an example of a first signal), the terminal device #3 may determine an on duration period of the terminal device #3 or a running period of an on duration timer based on a receiving moment of the WUS.

For another example, after receiving the PDCCH, the terminal device #3 may determine a running period of a drx-inactivity timer based on a receiving moment of the PDCCH.

For another example, the terminal device #3 may determine a running period of a DRX retransmission timer based on a receiving status of downlink data.

If the terminal device #3 determines that the terminal device #3 is not in the running period of any one of the on duration timer, the drx-inactivity timer, or the DRX retransmission timer at a current moment, the terminal device #3 may determine that the terminal device #3 is not in the active time currently, that is, a determining result in S320 is "no".

Alternatively, if the terminal device #3 determines that the terminal device #3 is not in the running period of any one of the on duration timer, the drx-inactivity timer, or the DRX retransmission timer in the time period #Y, the terminal device #3 may determine that the terminal device #3 is not in the active time in the time period #Y, that is, a determining result in S320 is "no".

Therefore, in S330, the terminal device #3 may receive the TRS of the type #2 in the time period #Y.

For example, the access device and the terminal device #3 may determine sending periodicities of a plurality of TRSs (specifically, TRSs of the type #2) in the time period #Y, and transmit the TRSs of the type #2 based on the sending periodicities.

It should be noted that the foregoing listed transmission process of the TRS of the type #2 is merely an example for description, and this application is not limited thereto. A method for transmitting the TRS of the type #2 may be similar to the method for transmitting the TRS of the type #2 shown in FIG. 9. To avoid repetition, detailed descriptions thereof are omitted.

In this application, the TRS may include the TRS of the type #1 and the TRS of the type #2. However, it should be noted that this application may also be applicable to a CSI-RS, including a CSI-RS of a type #1 and a CSI-RS of a type #2, and the method is similar.

Figure 12:
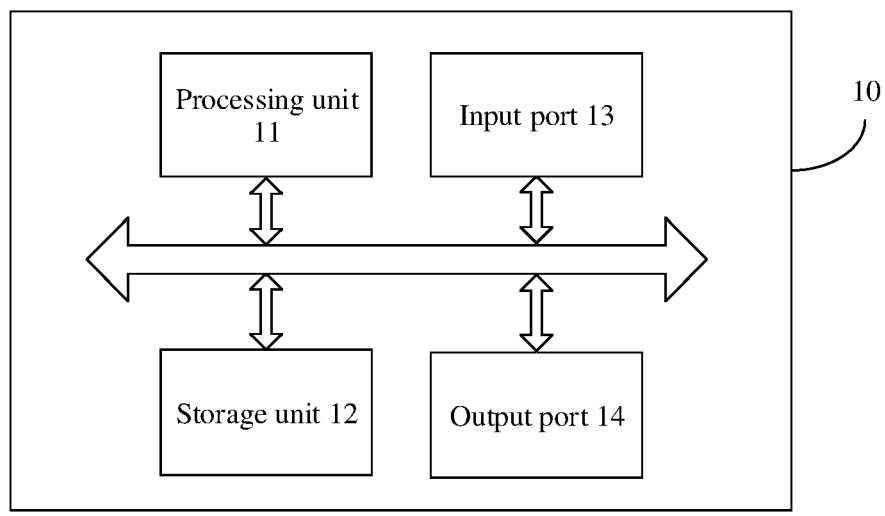
FIG. 12 is a schematic block diagram of an example of a TRS receiving apparatus according to this application.

According to the foregoing methods, FIG. 12 is a schematic diagram of a communication apparatus 10 according to an embodiment of this application. As shown in FIG. 12, the apparatus 10 may be a terminal device, or may be a chip or a circuit, for example, a chip or a circuit that may be disposed in a terminal device.

The signal processing apparatus 10 may include a processing unit 11 (that is, an example of a processing unit) and a storage unit 12. The storage unit 12 is configured to store instructions, and the processing unit 11 is configured to execute the instructions stored in the storage unit 12, so that the signal processing apparatus 10 implements the steps performed by the terminal device (for example, the terminal device #1 or the terminal device #2) in the foregoing methods.

Further, the apparatus 10 may further include an input port 13 (an example of a communication unit) and an output port 14 (another example of the communication unit). Further, the processing unit 11, the storage unit 12, the input port 13, and the output port 14 may communicate with each other through an internal connection path, to transmit a control signal and/or a data signal. The storage unit 12 is configured to store a computer program. The processing unit 11 may be configured to invoke the computer program from the storage unit 12 and run the computer program, to control the input port 13 to receive a signal, and control the output port 14 to send a signal, to complete the steps performed by the terminal device in the foregoing method. The storage unit 12 may be integrated into the processing unit 11, or may be disposed separately from the processing unit 11.

Optionally, if the signal processing apparatus 10 is a terminal device, the input port 13 is a receiver, and the output port 14 is a transmitter. The receiver and the transmitter may be a same physical entity or different physical entities. When the receiver and the transmitter are a same physical entity, the receiver and the transmitter may be collectively referred to as a transceiver.

Optionally, if the signal processing apparatus 10 is a chip or a circuit, the input port 13 is an input interface and the output port 14 is an output interface.

In an implementation, it may be considered that functions of the input port 13 and the output port 14 are implemented by using a transceiver circuit or a dedicated transceiver chip. It may be considered that the processing unit 11 may be implemented by using a dedicated processing chip, a processing circuit, a processing unit, or a universal chip.

In another implementation, it may be considered that the terminal device provided in this embodiment of this application is implemented by using a general-purpose computer. To be specific, program code for implementing functions of the processing unit 11, the input port 13, and the output port 14 is stored in the storage unit 12, and a general-purpose processing unit implements the functions of the processing unit 11, the input port 13, and the output port 14 by executing the code in the storage unit 12.

In an implementation, the input port 13 is configured to receive a reference signal by the terminal device. When the processing unit 11 determines that the terminal device is out of an active time, the processing unit 11 controls the input port 13 to detect a WUS signal, and determines, based on a detection result of the WUS signal, whether to use a TRS of a type #1 to perform time-frequency tracking. When the processing unit 11 determines that the terminal device is in the active time, the processing unit 11 controls the input port 13 to receive a TRS of a type #2. The TRS of the type #1 and the TRS of the type #2 are reference signals used for time-frequency tracking and/or channel measurement.

For example, after the input port 13 receives the WUS, the processing unit 11 may determine an on duration (on duration) period of the terminal device #1 or a running period of an on duration timer based on a receiving moment of the WUS.

For another example, after the input port 13 receives a PDCCH, the processing unit 11 may determine a running period of a drx-inactivity timer based on a receiving moment of the PDCCH.

For another example, the processing unit 11 may determine a running period of a DRX retransmission timer based on a receiving status of downlink data of the terminal device #1.

If the processing unit 11 determines that the terminal device #1 is not in the running period of any one of the on duration timer, the drx-inactivity timer, or the DRX retransmission timer at a current moment, the terminal device #1 may determine that the terminal device #1 is not in the active time currently, that is, a determining result in S220 is "no".

Alternatively, if the processing unit 11 determines that the terminal device #1 is not in the running period of any one of the on duration timer, the drx-inactivity timer, or the DRX retransmission timer in the time period #X, the terminal device #1 may determine that the terminal device #1 is not in the active time in the time period #X, that is, a determining result in S220 is "no".

Therefore, in S230, the input port 13 may receive the TRS of the type #1 in the time period #X.

The foregoing listed functions and actions of the modules or units in the apparatus 10 are merely examples for description. The modules or units in the apparatus 10 may be configured to perform actions or processing processes performed by the terminal device in the foregoing methods. To avoid repetition, detailed descriptions are omitted herein.

For concepts, explanations, detailed descriptions, and other steps of the apparatus 10 that are related to the technical solutions provided in the embodiments of this application, refer to the descriptions of the content in the foregoing methods or other embodiments. Details are not described herein again.

Figure 13:
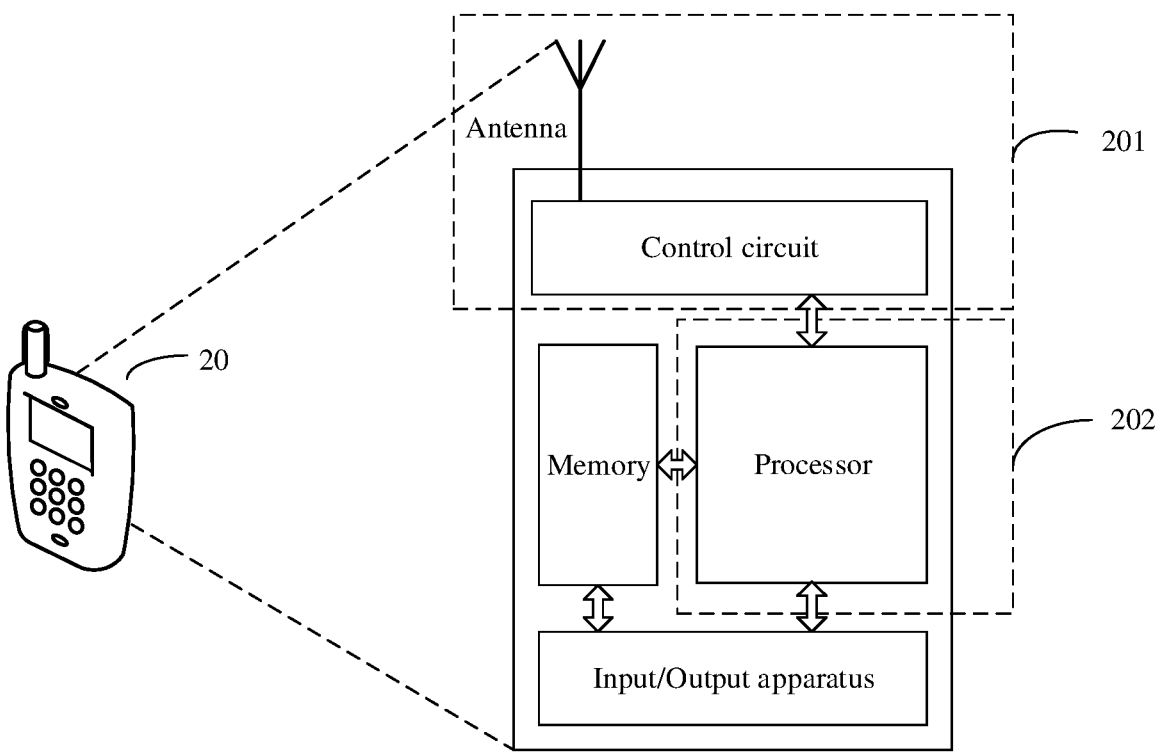
FIG. 13 is a schematic block diagram of an example of a terminal device according to this application.

FIG. 13 is a schematic structural diagram of a terminal device 20 according to this application. The apparatus 10 may be disposed in the terminal device 20, or the apparatus 10 itself may be the terminal device 20. In other words, the terminal device 20 may perform an action performed by the terminal device in the foregoing methods.

For ease of description, FIG. 13 shows only main components of the terminal device. As shown in FIG. 13, the terminal device 20 includes a processor, a memory, a control circuit, an antenna, and an input/output apparatus.

The processor is mainly configured to: process a communication protocol and communication data, control the entire terminal device, execute a software program, and process data of the software program, for example, is configured to support the terminal device in performing the actions described in the foregoing embodiments of the method for transmitting a precoding matrix indicator. The memory is mainly configured to store the software program and the data, for example, store the codebook described in the foregoing embodiments. The control circuit is mainly configured to: perform conversion between a baseband signal and a radio frequency signal, and process the radio frequency signal. A combination of the control circuit and the antenna may also be referred to as a transceiver that is mainly configured to send/receive a radio frequency signal in an electromagnetic wave form. The input/output apparatus, such as a touchscreen, a display screen, or a keyboard, is mainly configured to: receive data entered by a user, and output data to the user.

After the terminal device is powered on, the processor may read the software program in the storage unit, interpret and execute instructions of the software program, and process the data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal to the outside by using the antenna in an electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 13 shows only one memory and one processor. An actual terminal device may have a plurality of processors and a plurality of memories. The memory may also be referred to as a storage medium, a storage device, or the like. This is not limited in this embodiment of this application.

For example, the processor may include a baseband processor and a central processing unit. The baseband processor is mainly configured to process the communication protocol and the communication data. The central processing unit is mainly configured to control the entire terminal device, execute the software program, and process the data of the software program. Functions of the baseband processor and the central processing unit are integrated into the processor in FIG. 13. A person skilled in the art may understand that the baseband processor and the central processing unit may alternatively be independent processors, and are interconnected by using technologies such as a bus. A person skilled in the art may understand that the terminal device may include a plurality of baseband processors to adapt to different network standards, the terminal device may include a plurality of central processing units to improve a processing capability of the terminal device, and means of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program, to implement a baseband processing function.

For example, in this embodiment of this application, the antenna having a transceiver function and the control circuit may be considered as a transceiver unit 201 of the terminal device 20, and the processor having a processing function may be considered as a processing unit 202 of the terminal device 20. As shown in FIG. 13, the terminal device 20 includes the transceiver unit 201 and the processing unit 202. The transceiver unit may also be referred to as a transceiver, a transceiver machine, a transceiver apparatus, or the like. Optionally, a component that is in the transceiver unit 201 and that is configured to implement a receiving function may be considered as a receiving unit, and a component that is in the transceiver unit 201 and that is configured to implement a sending function may be considered as a sending unit. In other words, the transceiver unit 201 includes the receiving unit and the sending unit. For example, the receiving unit may also be referred to as a receiver machine, a receiver, a receive circuit, or the like, and the sending unit may be referred to as a transmitter machine, a transmitter, a transmit circuit, or the like.

Figure 14:
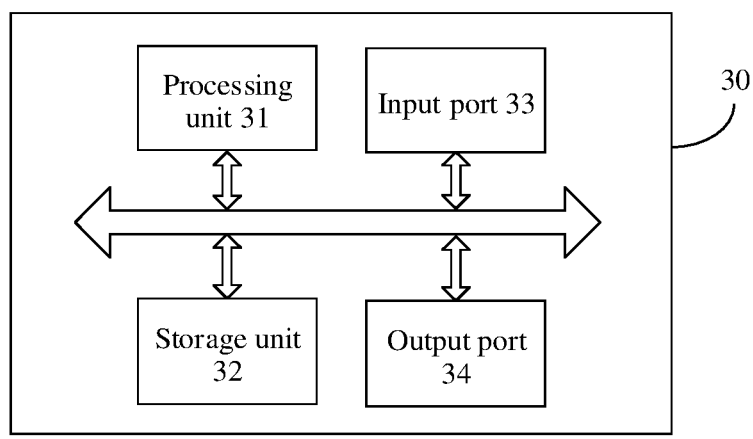
FIG. 14 is a schematic block diagram of an example of a TRS sending apparatus according to this application.

According to the foregoing method, FIG. 14 is a schematic diagram of a communication apparatus 30 according to an embodiment of this application. As shown in FIG. 14, the apparatus 30 may be a network device (for example, the foregoing access device), or may be a chip or a circuit, for example, a chip or a circuit that may be disposed in a network device.

The apparatus 30 may include a processing unit 31 and a storage unit 32. The storage unit 32 is configured to store instructions, and the processing unit 31 is configured to execute the instructions stored in the memory 32, so that the apparatus 30 implements the steps performed by the network device in the foregoing methods.

Further, the apparatus 30 may further include an input port 33 (namely, an example of a communication unit) and an output port 33 (namely, another example of the processing unit).

Further, the processing unit 31, the storage unit 32, the input port 33, and the output port 34 may communicate with each other through an internal connection path, to transmit a control signal and/or a data signal.

In addition, it may be considered that the network device provided in this embodiment of this application is implemented by using a general-purpose computer. To be specific, program code for implementing functions of the processing unit 31, the input port 33, and the output port 34 is stored in the storage unit, and a general-purpose processing unit implements the functions of the processing unit 31, the input port 33, and the output port 34 by executing the code in the storage unit.

The storage unit 32 is configured to store a computer program.

In an implementation, the processing unit 31 may be configured to invoke the computer program from the storage unit 32 and run the computer program, to control the output port 34 to send a reference signal to the terminal device. When the processing unit 31 determines that the terminal device is out of an active time, the processing unit 31 sends a TRS of a type #1 based on a determining result about whether a WUS signal needs to be sent to the terminal device. When the processing unit 31 determines that the terminal device is in the active time, the processing unit 31 controls the output port 34 to send a TRS of a type #2. The TRS of the type #1 and the TRS of the type #2 are reference signals used for time-frequency tracking and/or channel measurement.

For example, the processing unit 31 may perform a determining process of S210 based on sending statuses of a WUS and a PDCCH.

For example, after the output poll 34 sends the WUS, the processing unit 31 may determine an on duration period of the terminal device #1 or a running period of an on duration timer based on a sending moment of the WUS.

For another example, after the output port 34 sends a PDCCH, the processing unit 31 may determine a running period of a drx-inactivity timer based on a sending moment of the PDCCH.

For another example, the processing unit 31 may determine a running period of a DRX retransmission timer based on a receiving status of downlink data of the terminal device #1.

If the processing unit 31 determines that the terminal device is not in the running period of any one of the on duration timer, the drx-inactivity timer, or the DRX retransmission timer at a current moment, the access device may determine that the terminal device #1 is not in the active time currently, that is, a determining result in S210 is "no".

Alternatively, if the processing unit 31 determines that the terminal device #1 is not in the running period of any one of the on duration timer, the drx-inactivity timer, or the DRX retransmission timer in the time period #X, the access device may determine that the terminal device #1 is not in the active time in the time period #X, that is, a determining result in S210 is "no".

Therefore, in S230, the output port 34 may send a TRS (namely, an example of a first reference signal) of a type #1 in the time period #X.

The foregoing listed functions and actions of the modules or units in the apparatus 30 are merely examples for description. The modules or units in the apparatus 30 may be configured to perform actions or processing processes performed by the network device (for example, the foregoing access device) in the foregoing methods. To avoid repetition, detailed descriptions are omitted herein.

For concepts, explanations, detailed descriptions, and other steps of the apparatus 30 that are related to the technical solutions provided in the embodiments of this application, refer to the descriptions of the content in the foregoing methods or other embodiments. Details are not described herein again.

Figure 15:
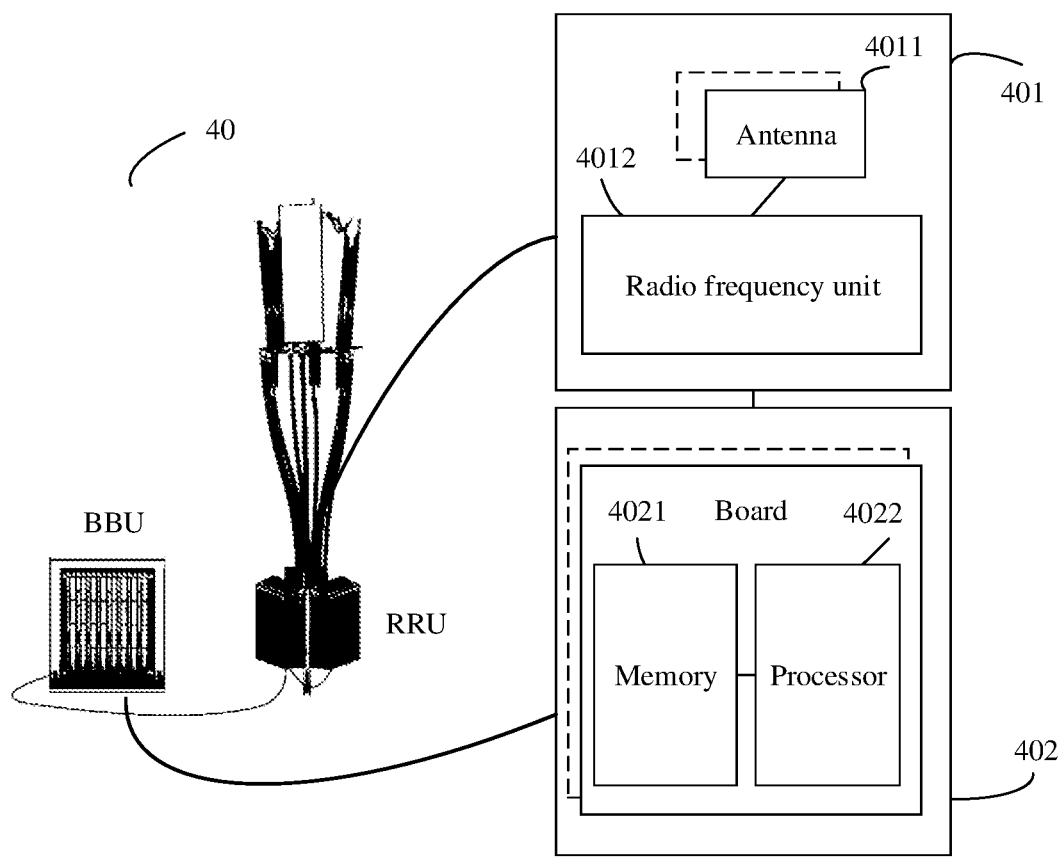
FIG. 15 is a schematic block diagram of an example of a network device according to this application.

FIG. 15 is a schematic structural diagram of a network device 40 according to an embodiment of this application. The network device 40 may be configured to implement a function of the network device (for example, the foregoing access device) in the foregoing methods. The network device 40 includes one or more radio frequency units such as a remote radio unit (RRU) 401 and one or more baseband units (BBU) (which may also be referred to as digital units (DU)) 402. The RRU 401 may be referred to as a transceiver unit, a transceiver, a transceiver circuit, a transceiver, or the like, and may include at least one antenna 4011 and a radio frequency unit 4012. The RRU 401 is mainly configured to: send and receive a radio frequency signal, and perform conversion between a radio frequency signal and a baseband signal, for example, configured to send the signaling message in the foregoing embodiments to a terminal device. The BBU 402 is mainly configured to: perform baseband processing, control a base station, and so on. The RRU 401 and the BBU 402 may be physically disposed together, or may be physically separate, to be specific, in a distributed base station.

The BBU 402 is a control center of the base station, may also be referred to as a processing unit, and is mainly configured to implement a baseband processing function, for example, channel coding, multiplexing, modulation, and spreading. For example, the BBU (the processing unit) 402 may be configured to control the base station 40 to perform the operation procedure related to the network device in the foregoing method embodiments.

In an example, the BBU 402 may include one or more boards, and a plurality of boards may jointly support a radio access network (such as an LTE system or a 5G system) of a single access standard, or may separately support radio access networks of different access standards. The BBU 402 further includes a memory 4021 and a processor 4022. The memory 4021 is configured to store a necessary instruction and necessary data. For example, the memory 4021 stores the codebook and the like in the foregoing embodiments. The processor 4022 is configured to control the base station to perform a necessary action, for example, control the base station to perform the operation procedure related to the network device in the foregoing method embodiments. The memory 4021 and the processor 4022 may serve the one or more boards. In other words, a memory and a processor may be independently disposed on each board. Alternatively, a plurality of boards may share a same memory and a same processor. In addition, a necessary circuit may be further disposed on each board.

In a possible implementation, with development of a system-on-chip (SoC) technology, all or some functions of the BBU 402 and the RRU 401 may be implemented through the SoC technology, for example, implemented through a base station function chip. The base station function chip integrates components such as a processor, a memory, and an antenna port. A program of a base station-related function is stored in the memory. The processor executes the program to implement the base station-related function. Optionally, the base station function chip can also read a memory outside the chip to implement the base station-related function.

It should be understood that the structure of the network device shown in FIG. 15 is merely a possible form, but should not constitute any limitation on the embodiments of this application. In this application, there may be a base station structure in another form in the future.

According to the methods provided in the embodiments of this application, an embodiment of this application further provides a communication system, including the foregoing network device and one or more terminal devices.

It should be understood that, the processor in the embodiments of this application may be a central processing unit (CPU), or may further be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It should further be understood that the memory in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. Through example but not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by software, hardware, firmware, or any combination thereof. When software is used to implement the embodiments, all or some of the foregoing embodiments may be implemented in a form of a computer program product. The computer program product includes one or more computer instructions or computer programs. When the computer instructions or the computer programs are loaded or executed on a computer, all or some of the procedures or functions according to the embodiments of this application are generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such an implementation goes out of the scope of this application. It may be clearly understood by a person skilled in the art that for the purpose of convenient and brief description, for a detailed working process of the described system, apparatus, and unit, refer to a corresponding process in the foregoing method embodiments. In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions in the embodiments. In addition, functional units in the embodiments of this application may be integrated into one processing unit, or each of the units may exist alone physically, or two or more units may be integrated into one unit. When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    while a terminal device is out of a first time period, attempting to detect, by the terminal device, a first signal, and determining, based on a detection result of the first signal, whether to use a first reference signal to perform time-frequency tracking or channel measurement, wherein the first signal is a wake-up signal indicating to the terminal device to wake-up and enter the first time period, and wherein determining, based on the detection result of the first signal, whether to use the first reference signal to perform time-frequency tracking or channel measurement comprises:
    in response to the terminal device detecting the first signal, receiving, by the terminal device, the first reference signal while the terminal device is out of the first time period, wherein the first reference signal is transmitted at a different time but in a same time unit as the first signal, and using the first reference signal to perform time-frequency tracking or channel measurement; and
    receiving, by the terminal device, a second reference signal while the terminal device is in the first time period,
    wherein the first reference signal and the second reference signal are reference signals configured to be used for time-frequency tracking or channel measurement.

2. The method according to claim 1, wherein attempting to detect, by the terminal device, the first signal, and determining, based on the detection result of the first signal, whether to use the first reference signal to perform time-frequency tracking or channel measurement comprises:
  in response to the terminal device detecting the first signal on a first transmission occasion, detecting, by the terminal device, the first reference signal on a second transmission occasion after the first transmission occasion, and using the first reference signal to perform time-frequency tracking or channel measurement; and
  in response to the terminal device failing to detect the first signal on the first transmission occasion, skipping detecting, by the terminal device, the first reference signal on the second transmission occasion.

3. The method according to claim 1, wherein attempting to detect, by the terminal device, the first signal, and determining, based on the detection result of the first signal, whether to use the first reference signal to perform time-frequency tracking or channel measurement comprises:
  attempting to demodulate and detect, by the terminal device, the first signal based on the first reference signal; and
  performing the following:
    in response to the terminal device detecting the first signal, using, by the terminal device, the first reference signal to perform time-frequency tracking or channel measurement; or
    in response to the terminal device failing to detect the first signal, skipping using, by the terminal device, the first reference signal to perform time-frequency tracking or channel measurement.

4. The method according to claim 1, wherein receiving, by the terminal device, the second reference signal comprises:
  periodically receiving, by the terminal device, the second reference signal in the first time period.

5. A method, comprising:
  sending, by an access device while a terminal device is out of a first time period, a first signal, wherein the first signal is a wake-up signal indicating to the terminal device to wake-up and enter the first time period;
  in response to sending the first signal, determining, by the access device, to send a first reference signal to the terminal device while the terminal device is out of the first time period, wherein the first reference signal is transmitted at a different time but in a same time unit as the first signal;
  sending, by the access device, a second reference signal to the terminal device while the terminal device is in the first time period; and
  wherein the first reference signal and the second reference signal are configured to be used for time-frequency tracking or channel measurement.

6. The method according to claim 5, wherein determining, by the access device while the terminal device is out of the first time period, whether to send the first reference signal to the terminal device comprises:
  sending, by the access device while the terminal device is out of the first time period, the first reference signal to the terminal device on a second transmission occasion in response to the access device sending the first signal to the terminal device on a first transmission occasion, the second transmission occasion being after the first transmission occasion.

7. The method according to claim 5, wherein sending, by the access device, the second reference signal comprises:
  periodically sending, by the access device, the second reference signal in the first time period.

8. A terminal device, comprising:
  a processor, configured to:
    while the terminal device is out of a first time period, attempt to detect a first signal, and determine, based on a detection result of the first signal, whether to use a first reference signal to perform time-frequency tracking or channel measurement, wherein when the first signal is a wake-up signal indicating to the terminal device to wake-up and enter the first time period, and wherein determining, based on the detection result of the first signal, whether to use the first reference signal to perform time-frequency tracking or channel measurement comprises:
      in response to detecting the first signal, receive the first reference signal while the terminal device is out of the first time period, wherein the first reference signal is sent at a different time but in a same time unit as the first signal, and using the first reference signal to perform time-frequency tracking or channel measurement; and
    a transceiver, configured to receive, a second reference signal while the terminal device is in the first time period,
  wherein the first reference signal and the second reference signal are usable for time-frequency tracking or channel measurement.

9. The terminal device according to claim 8, wherein the processor is configured to:
  in response to the terminal device detecting the first signal on a first transmission occasion, detect the first reference signal on a second transmission occasion after the first transmission occasion, and use the first reference signal to perform time-frequency tracking or channel measurement; and
  in response to the terminal device failing to detect the first signal on the first transmission occasion, skip detecting, the first reference signal on the second transmission occasion.

10. The terminal device according to claim 8, wherein the processor is configured to:
  attempt to demodulate and detect the first signal based on the first reference signal; and
  perform the following:
    in response to the terminal device detecting the first signal, use the first reference signal to perform time-frequency tracking or channel measurement; or
    in response to the terminal device failing to detect the first signal, skip using the first reference signal to perform time-frequency tracking or channel measurement.

11. The terminal device according to claim 8, wherein the transceiver is configured to: periodically receive the second reference signal in the first time period.

12. The terminal device according to claim 8, wherein the processor is configured to:
  in response to a transmission occasion of the first reference signal being in the first time period, skip detecting the first reference signal on the transmission occasion of the first reference signal.

13. An access device, comprising:
  a processor, configured to in response to the access device sending a first signal, determine, while a terminal device is out of a first time period, to send a first reference signal to the terminal device, wherein the first signal is a wake-up signal indicating to the terminal device to wake-up and enter the first time period; and
  a transceiver, configured to send the first signal and the first reference signal to the terminal device while the terminal device is out of the first time period, and to send a second reference signal to the terminal device while the terminal device is in the first time period, wherein the first reference signal is sent at a different time but in a same time unit as the first signal; and wherein the first reference signal and the second reference signal are usable for time-frequency tracking or channel measurement.

14. The access device according to claim 13, wherein the transceiver is configured to:

send, while the terminal device is out of the first time period, the first reference signal to the terminal device on a second transmission occasion in response to the access device sending the first signal to the terminal device on a first transmission occasion, the second transmission occasion being after the first transmission occasion.

15. The access device according to claim 13, wherein the transceiver is configured to: periodically send, the second reference signal in the first time period.

* * * * *